United States Patent
Douglas et al.

(10) Patent No.: US 12,458,139 B2
(45) Date of Patent: Nov. 4, 2025

(54) U-SHAPED HEIGHT ADJUSTABLE DESK

(71) Applicant: CKnapp Sales, Inc., Goodfield, IL (US)

(72) Inventors: Jakob Douglas, Morton, IL (US); Micah Fehr, Danvers, IL (US); Cody Ryan Hirstein, Eureka, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 131 days.

(21) Appl. No.: 18/505,102

(22) Filed: Nov. 8, 2023

(65) Prior Publication Data

US 2025/0143449 A1    May 8, 2025

(51) Int. Cl.
*A47B 9/20* (2006.01)
*A47B 13/02* (2006.01)
*A47B 13/08* (2006.01)
*A47B 13/10* (2006.01)
*A47B 17/02* (2006.01)
(Continued)

(52) U.S. Cl.
CPC ............... *A47B 9/20* (2013.01); *A47B 13/02* (2013.01); *A47B 13/088* (2013.01); *A47B 13/10* (2013.01); *A47B 17/02* (2013.01); *A47B 13/003* (2013.01); *A47B 21/02* (2013.01); *A47B 2200/0015* (2013.01); *A47B 2200/0055* (2013.01); *A47B 2200/0057* (2013.01); *A47B 2200/0066* (2013.01); *A47B 2200/0081* (2013.01); *A47B 2230/0037* (2013.01)

(58) Field of Classification Search
CPC .... A47B 9/04; A47B 9/08; A47B 9/06; A47B 21/0314; A47B 21/02; A47B 21/04; A47B 2200/0071; A47B 2200/0075; A47B 2200/12; A47B 2200/0073; A47B 2200/0097; A47B 2200/0062; A47B 2200/0051; A47B 2200/0056; A47B 2200/0054; A47B 2200/0058; A47B 2200/0059; A47B 2021/0364; A47B 2021/066

USPC ........ 248/188.2, 188.5; 108/144.11, 147, 20, 108/147.19, 96

See application file for complete search history.

(56) References Cited

U.S. PATENT DOCUMENTS

| | | | | |
|---|---|---|---|---|
| 3,794,398 A | * | 2/1974 | Lindsay | A47B 37/00 312/241 |
| 3,875,872 A | * | 4/1975 | Kayner | A47B 13/08 108/1 |
| 4,217,832 A | | 8/1980 | Pozzan | |

(Continued)

FOREIGN PATENT DOCUMENTS

| CH | 710641 A2 | 7/2016 |
|---|---|---|
| CN | 104872994 A | 9/2015 |

(Continued)

OTHER PUBLICATIONS

CN115530521 English translation (Year: 2022).*

(Continued)

*Primary Examiner* — Janet M Wilkens
(74) *Attorney, Agent, or Firm* — Lund IP PLLC

(57) ABSTRACT

An adjustable desk includes four extendable legs and an open-sided adjustable frame. The open-sided adjustable frame provides an open space between two of the extendable legs such that the open-sided adjustable frame is suitable for supporting a U-shaped desktop.

24 Claims, 19 Drawing Sheets

(51) Int. Cl.
*A47B 13/00* (2006.01)
*A47B 21/02* (2006.01)

(56) References Cited

U.S. PATENT DOCUMENTS

| | | | |
|---|---|---|---|
| 4,381,714 | A | 5/1983 | Henneberg et al. |
| 4,752,102 | A | 6/1988 | Rasmussen |
| 5,408,940 | A | 4/1995 | Winchell |
| 5,437,236 | A | 8/1995 | Zeiner |
| 5,536,078 | A * | 7/1996 | Novikoff ............ F16B 12/2054 |
| | | | 312/265.5 |
| 6,382,109 | B1 * | 5/2002 | Novikoff ............ A47B 87/002 |
| | | | 108/65 |
| 7,908,981 | B2 | 3/2011 | Agee |
| 8,291,833 | B2 | 10/2012 | Skiba |
| 8,967,054 | B2 | 3/2015 | Henriott et al. |
| 9,700,135 | B2 | 7/2017 | Herring et al. |
| 9,703,278 | B2 | 7/2017 | Kristensen |
| 9,723,916 | B2 | 8/2017 | Chen |
| 9,989,133 | B2 | 6/2018 | Wu |
| 10,114,352 | B2 | 10/2018 | Matlin |
| 10,244,861 | B1 | 4/2019 | Poniatowski |
| D878,813 | S | 3/2020 | Knapp et al. |
| 10,588,401 | B1 | 3/2020 | Lu |
| D882,986 | S | 5/2020 | Knapp et al. |
| D885,089 | S | 5/2020 | Knapp et al. |
| D885,090 | S | 5/2020 | Knapp et al. |
| 10,842,258 | B2 | 11/2020 | Applegate et al. |
| 10,863,820 | B1 | 12/2020 | Lin |
| 10,893,748 | B1 | 1/2021 | Poniatowski |
| 11,089,865 | B2 | 8/2021 | Knapp et al. |
| 11,096,481 | B2 | 8/2021 | Patton et al. |
| D933,400 | S * | 10/2021 | Wang ............................ D6/648 |
| 11,134,777 | B2 | 10/2021 | Knapp et al. |
| D965,349 | S | 10/2022 | Cheng et al. |
| D966,016 | S | 10/2022 | Wang |
| D966,752 | S | 10/2022 | Wang |
| D972,342 | S | 12/2022 | Chen |
| 11,553,789 | B2 | 1/2023 | Knapp et al. |
| 11,647,831 | B2 | 5/2023 | Pan |
| 11,696,637 | B2 | 7/2023 | Lin |
| D1,074,263 | S * | 5/2025 | Douglas ........................ D6/648 |
| 12,303,022 | B2 | 5/2025 | Meyer et al. |
| 2008/0289545 | A1 | 11/2008 | Picchio |
| 2012/0043436 | A1 | 2/2012 | Atkinson |
| 2016/0102693 | A1 | 4/2016 | Wang |
| 2017/0303679 | A1 | 10/2017 | Tseng |
| 2020/0154876 | A1 | 5/2020 | Liu |
| 2020/0170404 | A1 | 6/2020 | Knapp et al. |
| 2020/0260862 | A1 | 8/2020 | Knapp et al. |
| 2021/0037963 | A1 | 2/2021 | Knapp et al. |
| 2022/0022646 | A1 | 1/2022 | Mohr |
| 2022/0304463 | A1 | 9/2022 | Zhu |
| 2023/0309688 | A1 | 10/2023 | Xiang et al. |
| 2024/0008636 | A1 | 1/2024 | Li |
| 2024/0292944 | A1 * | 9/2024 | Meyer ...................... A47B 9/04 |
| 2025/0234988 | A1 | 7/2025 | Meyer |

FOREIGN PATENT DOCUMENTS

| | | | | |
|---|---|---|---|---|
| CN | 214594809 | U * | 11/2021 | |
| CN | 214904563 | U * | 11/2021 | ............... A47B 9/04 |
| CN | 215423320 | U | 1/2022 | |
| CN | 115530521 | A * | 12/2022 | |
| DE | 2811980 | A * | 10/1978 | ............. A47B 85/00 |
| DE | 102016109792 | A1 * | 12/2016 | ............... A47B 9/04 |
| DE | 202021104355 | U1 | 8/2021 | |
| EP | 2823731 | A2 * | 1/2015 | ............. A47B 13/02 |
| KR | 20160021696 | A * | 2/2016 | |
| KR | 20170042920 | A * | 4/2017 | |
| WO | WO-8910077 | A1 * | 11/1989 | |
| WO | 2018185683 | A1 | 10/2018 | |
| WO | 2022188526 | A1 | 9/2022 | |

OTHER PUBLICATIONS

DE102016109792 English translation (Year: 2016).*
KR20160021696 English translation (Year: 2016).*
"Black Electric 4-Leg Dual Motor Desk Frame; SKU: DESK-E-400B; Instruction Manual," Jul. 11, 2022; 20 pages; VIVO; Goodfield, Illinois.

* cited by examiner

101

102

103

104

105

127

U-SHAPED HEIGHT ADJUSTABLE DESK

TECHNICAL FIELD

This disclosure relates to adjustable height desks.

BACKGROUND

Adjustable height desks allow users to customize workspace and viewing heights to their individual preferences for both standing and sitting.

BRIEF SUMMARY

Adjustable height desk frames disclosed herein include adjustable height legs interconnected with an adjustable frame suitable for mounting different desktops of a range of widths and heights. Examples include desk frames with four legs and two motors, each motor configured to drive extension and retraction of two separate legs in unison. The two motors can operate in unison to maintain a level desktop surface by driving extension and retraction of the four separate legs in unison. Examples also include an open-sided adjustable frame suitable for U-shaped desktops.

In one example, an adjustable desk includes a first extendable leg including a first outer housing, a first inner housing, and a first actuation mechanism to selectively extend and retract the first inner housing relative to the first outer housing, a second extendable leg including a second outer housing, a second inner housing, and a second actuation mechanism to selectively extend and retract the second inner housing relative to the second outer housing, a third extendable leg including a third outer housing, a third inner housing, and a third actuation mechanism to selectively extend and retract the third inner housing relative to the third outer housing, a fourth extendable leg including a fourth outer housing, a fourth inner housing, and a fourth actuation mechanism to selectively extend and retract the fourth inner housing relative to the fourth outer housing, and an open-sided adjustable frame. The open-sided adjustable frame includes a first crossbar extending between the first extendable leg and the second extendable leg, a second crossbar extending between the second extendable leg and the third extendable leg, a third crossbar extending between the third extendable leg and the fourth extendable leg, and a plurality of desktop mounts configured to facilitate securing a desktop to the open-sided adjustable frame. The open-sided adjustable frame provides an open space between the first extendable leg and the fourth extendable leg.

In another example, a kit for an adjustable desk includes a first extendable leg including a first outer housing, a first inner housing, and a first actuation mechanism to selectively extend and retract the first inner housing relative to the first outer housing, a second extendable leg including a second outer housing, a second inner housing, and a second actuation mechanism to selectively extend and retract the second inner housing relative to the second outer housing, a third extendable leg including a third outer housing, a third inner housing, and a third actuation mechanism to selectively extend and retract the third inner housing relative to the third outer housing, a fourth extendable leg including a fourth outer housing, a fourth inner housing, and a fourth actuation mechanism to selectively extend and retract the fourth inner housing relative to the fourth outer housing, and an open-sided adjustable frame. The open-sided adjustable frame includes a first crossbar configured to extend between the first extendable leg and the second extendable leg, a second crossbar configured to extend between the second extendable leg and the third extendable leg, a third crossbar configured to extend between the third extendable leg and the fourth extendable leg, and a plurality of desktop mounts configured to facilitate securing a desktop to the open-sided adjustable frame. The open-sided adjustable frame is configured to provide an open space between the first extendable leg and the fourth extendable leg.

DETAILED DESCRIPTION

Figure 1A:
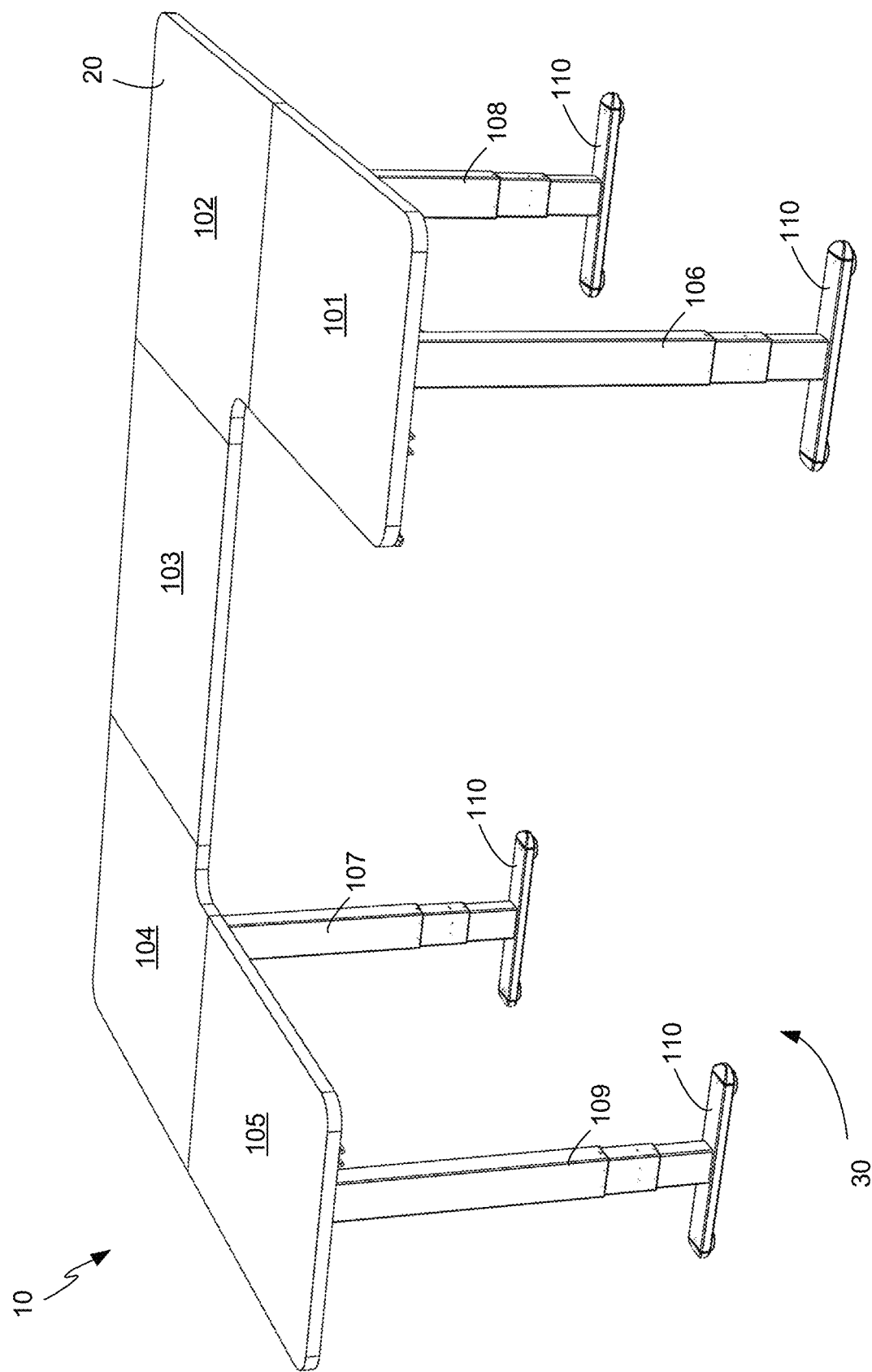
FIGS. 1A-1D illustrate an adjustable desk and components thereof.
Figure 1B:
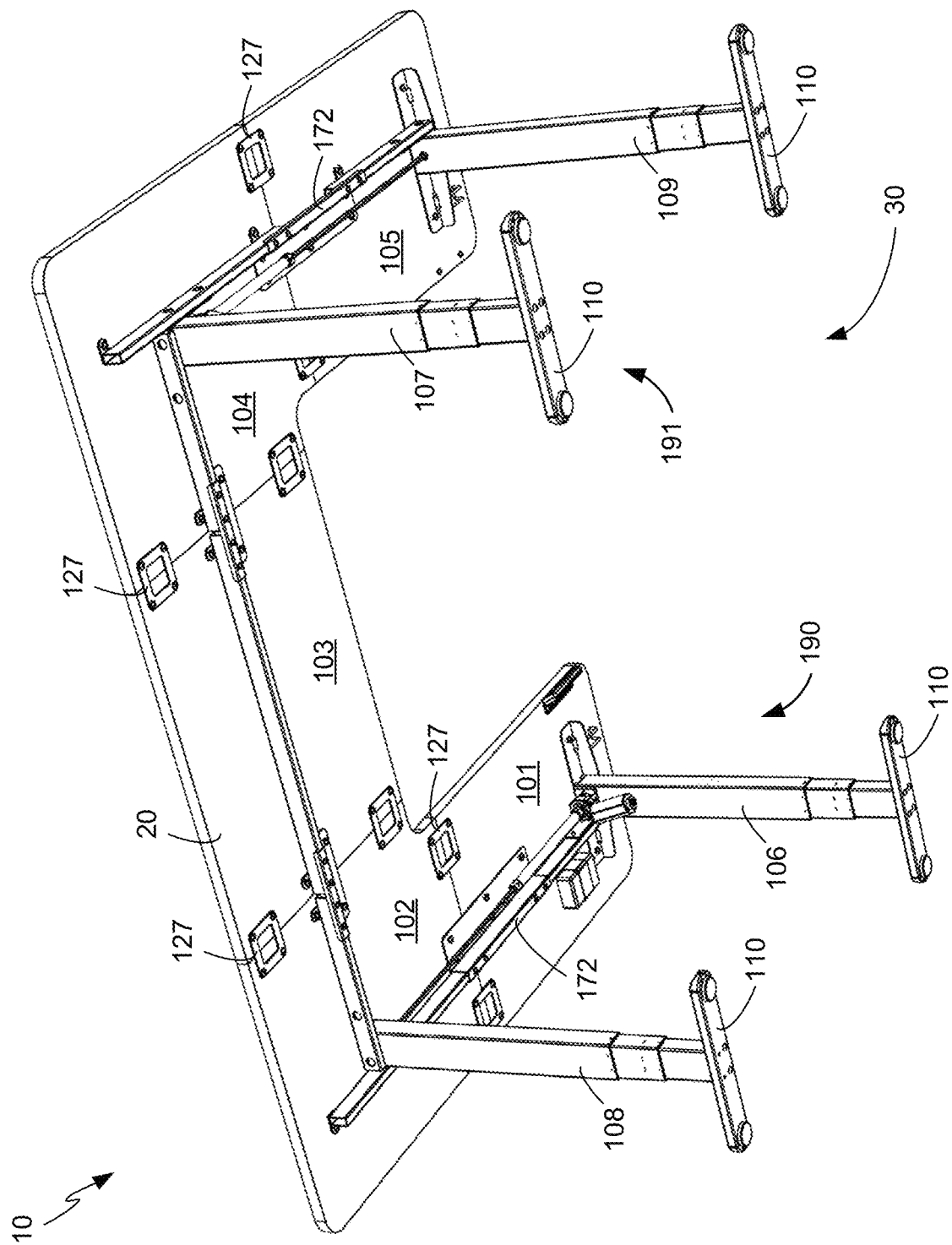
Figure 1C:
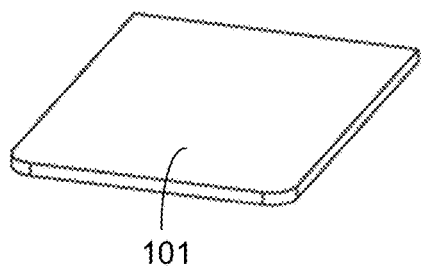
Figure 1C:
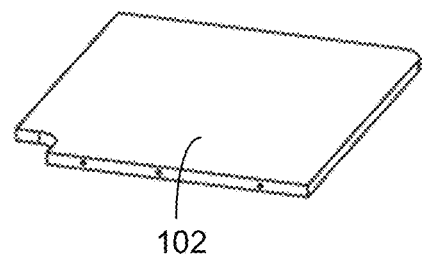
Figure 1C:
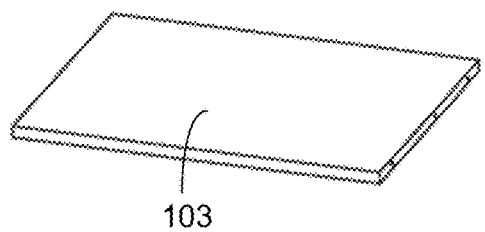
Figure 1C:
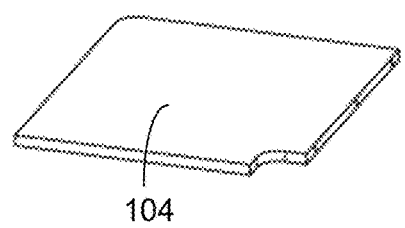
Figure 1C:
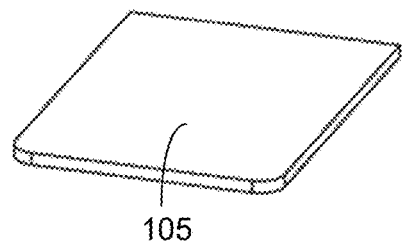
Figure 1C:
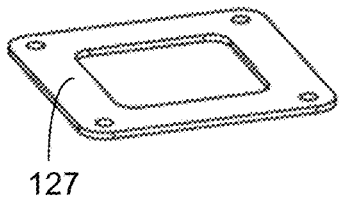
Figure 1D:
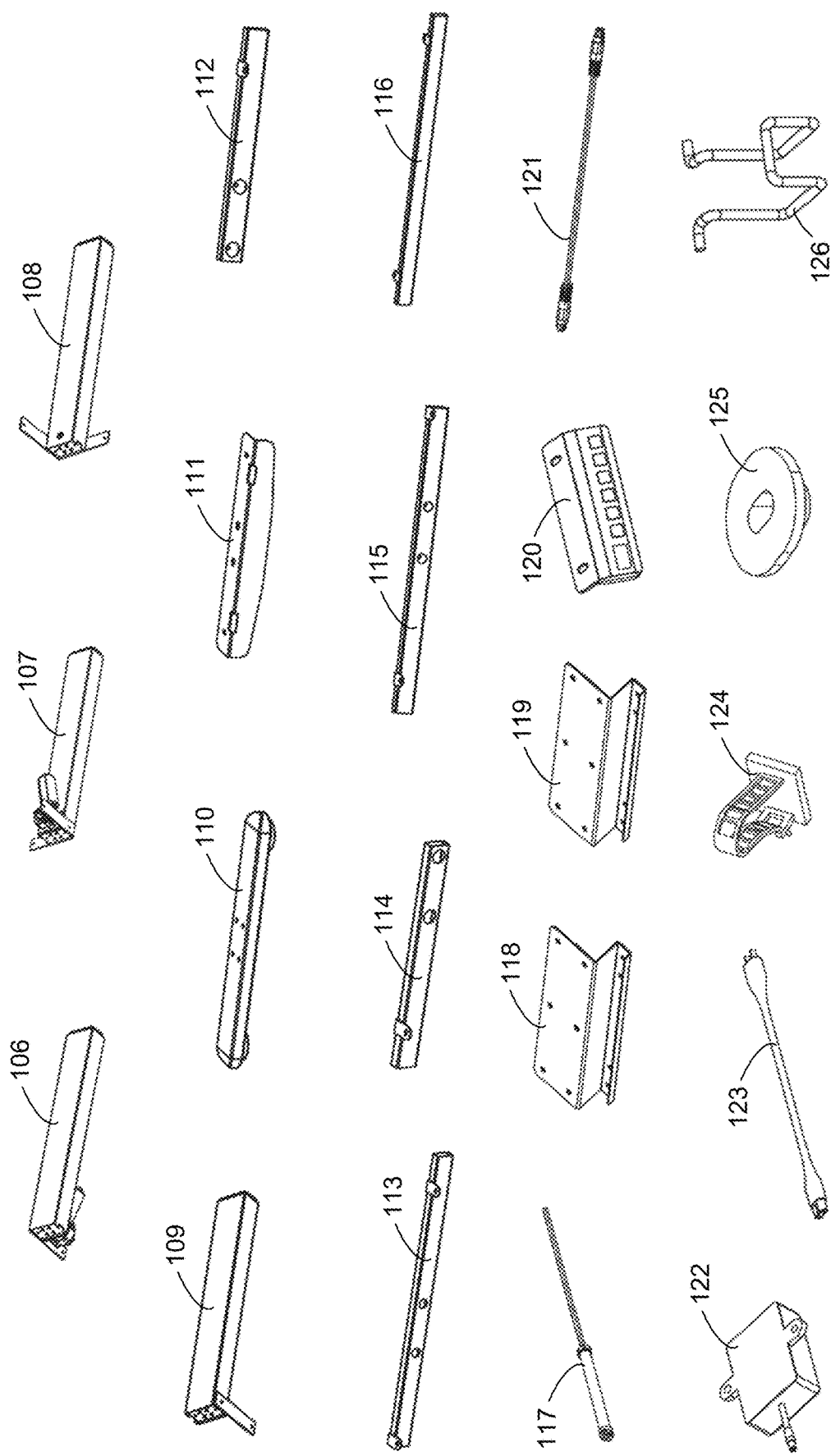
Figure 2A:
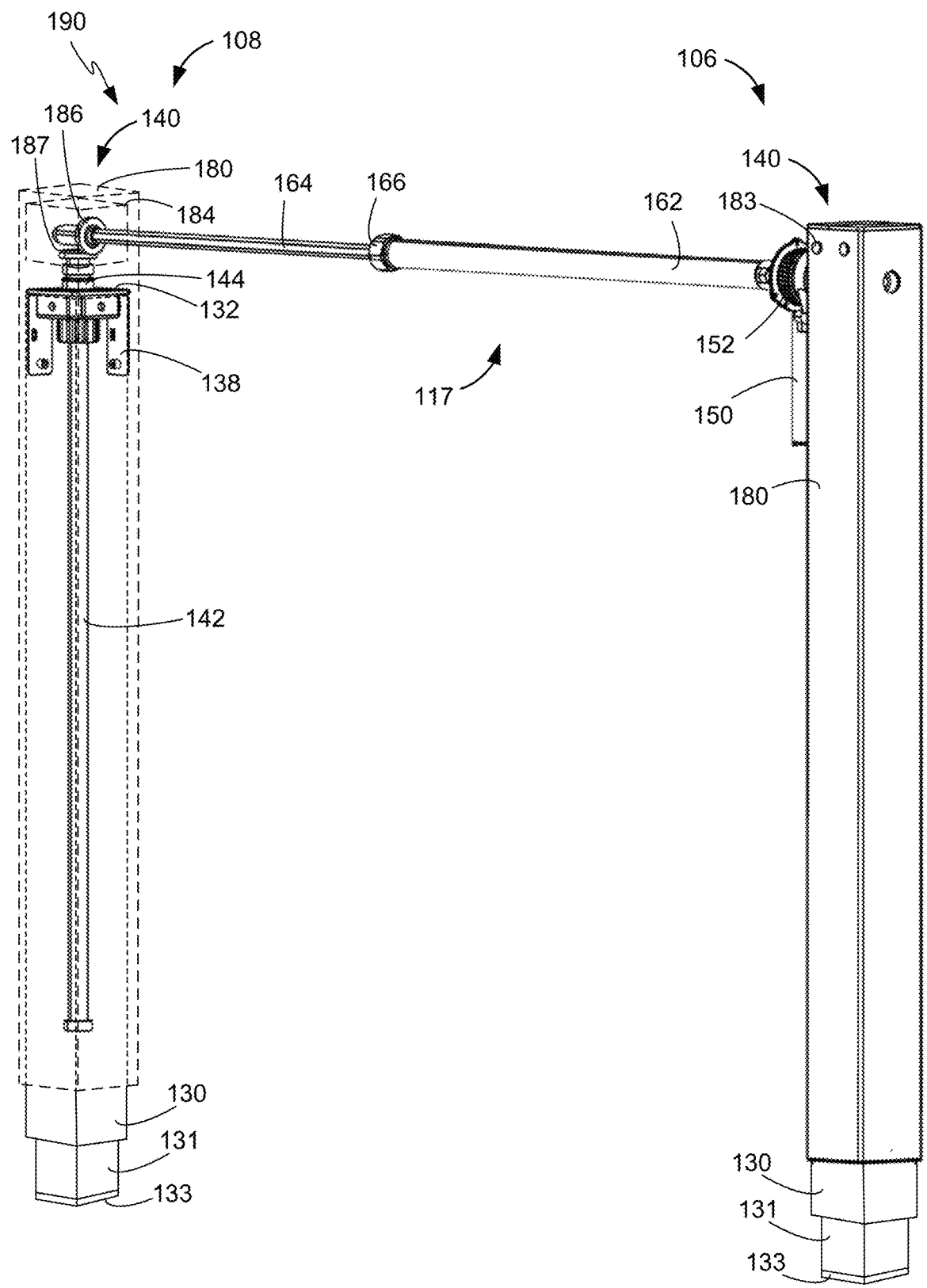
FIGS. 2A-2D illustrate an assembly including two adjustable height legs driven by a single motor.
Figure 2B:
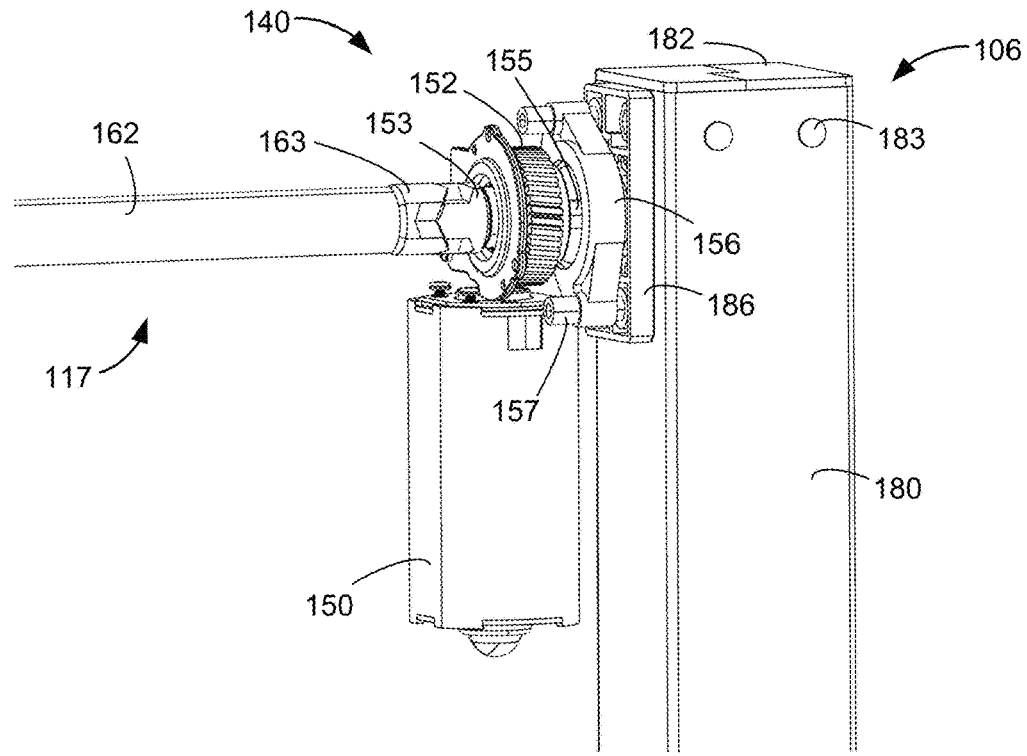
Figure 2C:
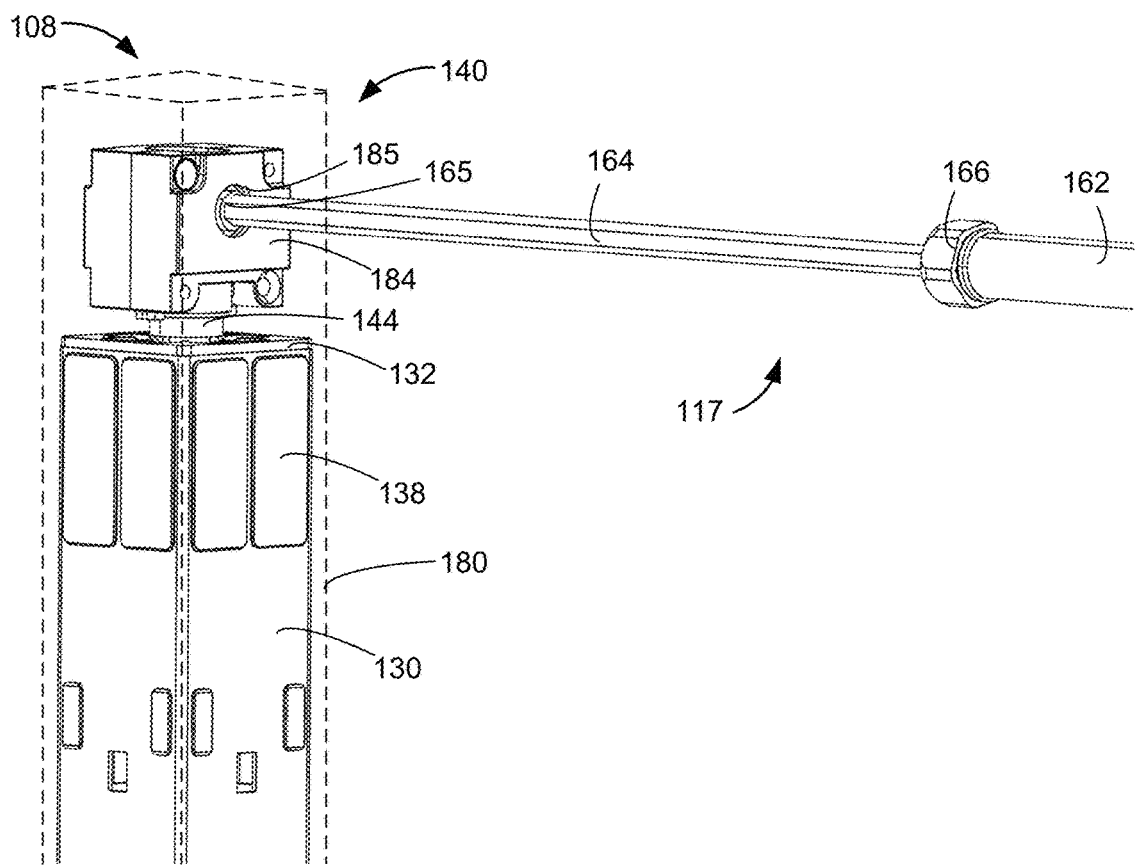
Figure 2D:
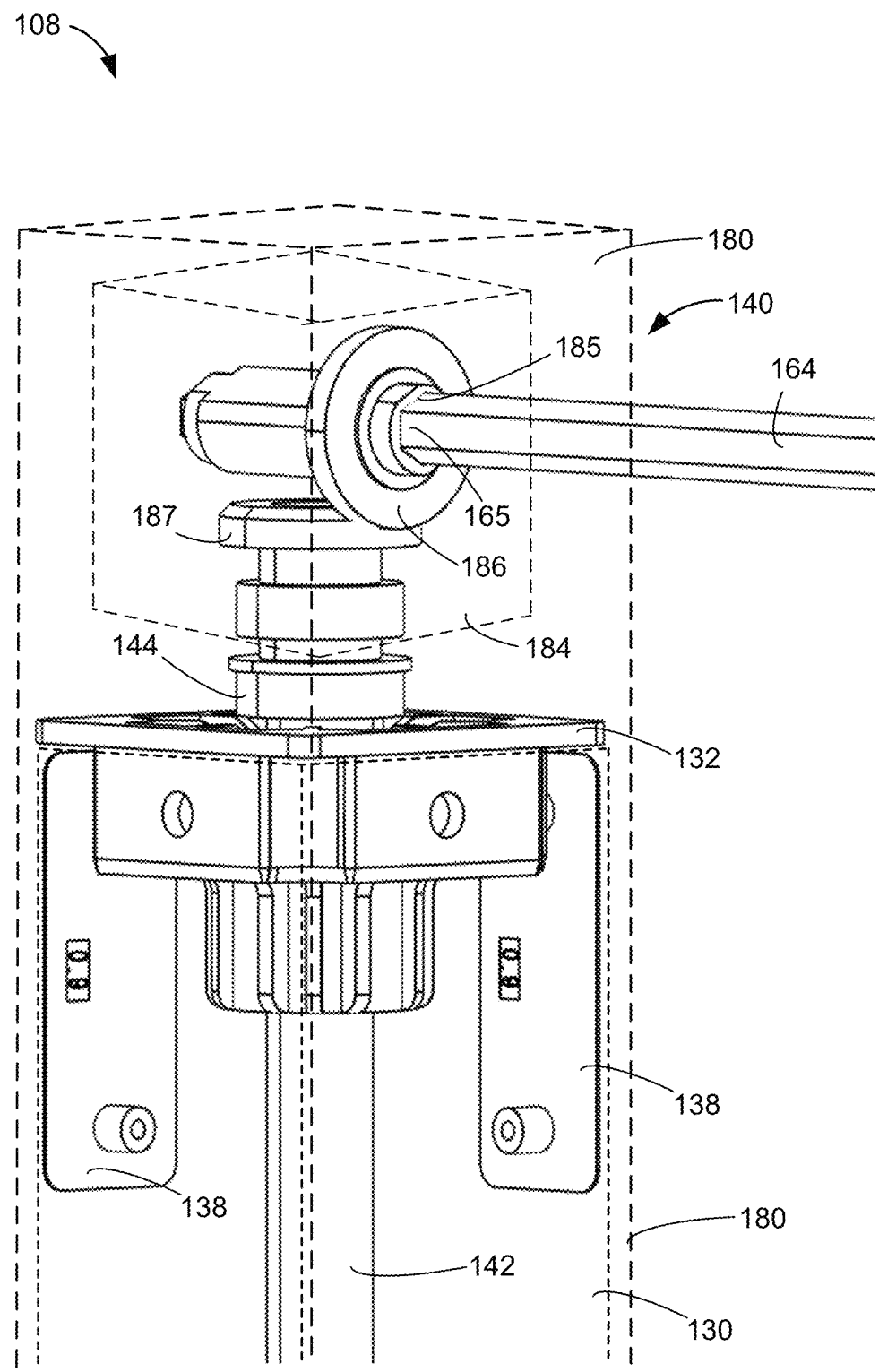

FIGS. 1A and 1B illustrate an adjustable desk 10 including a multi-piece desktop 20 mounted to an open-sided adjustable frame 30. FIG. 1C illustrates components of the multi-piece desktop 20, and FIG. 1D illustrates components of the adjustable frame 30.

Separate components in a multi-piece desktop 20 are shown in FIG. 1C. These components include:
  Right desktop extension 101 (×1)
  Right desktop corner 102 (×1)
  Middle desktop 103 (×1)
  Left desktop corner 104 (×1)
  Left desktop extension 105 (×1)
  Connector plates 127 (×8)

In some examples, adjustable frame 30 may be sold as a kit without a separate desktop 20. Separate components in an example kit for adjustable frame 30 are shown in FIG. 1D. These components include:
  Front right motorized leg 106 (×1)
  Rear left motorized leg 107 (×1)
  Rear right leg 108 (×1)
  Front left leg 109 (×1)
  Foot 110 (×4)
  Side bracket 111 (×2)
  Short right crossbar segment 112 (×2)
  Long right crossbar segment 113 (×1)
  Short left crossbar segment 114 (×2)
  Long left crossbar segment 115 (×1)
  Middle crossbar segment 116 (×1)
  Linkage 117 (×2)
  Long connector bracket 118 (×2)
  Short connector bracket 119 (×2)
  Control panel 120 (×1)
  Extension cable 121 (×4)
  Power adapter 122 (×1)
  Power cable 123 (×1)
  Cable clips 124 (×4)
  Rubber pads 125 (×36)
  Hook 126 (×2)

Adjustable desk 10 includes four extendable legs: two motorized extendable legs 106, 107, and two adjustable extendable legs 108, 109. Each leg 106, 107, 108, 109 includes a telescoping actuator. Each extendable leg 106, 107, 108, 109 includes an outer housing 180, two nesting inner housings 130, 131, and an actuation mechanism 140 to selectively extend and retract the inner housings 130, 131 relative to the outer housing 180. Any suitable mechanical designs may be utilized for the telescoping actuator, such as, but not limited to rigid belt, segmented spindle, rigid chain, and helical band telescoping actuators. In other examples, other extendable leg designs may be used, such as a simple actuator including an outer housing 180 and a single telescoping inner housing 130. The extension and retraction of the inner housing 130 is controlled by a motor or other drive mechanism.

Outer housing 180 includes an optional cap 182 on one end and an open end on the opposite end. The nesting inner housings 130, 131 protrude out the open end of outer housing 180. Inner housing 131 includes a cap 133 including threaded holes to secure leg foot 110 with screws (FIG. 3C).

Extendable legs 106, 107 include a motor 150 mounted to the outer housing 180 to drive their actuation mechanisms 140. Specifically, the assembly of motor 150 includes a mounting plate 155 which is secured to a corresponding mounting plate 156 on outer housing 180 with screws 157. Mounting plate 156 may be secured to outer housing 180 by any suitable technique such as welding, screws, or rivets.

In contrast to extendable legs 106, 107, extendable legs 108, 109 do not include a motor 150. Instead, extendable legs 108, 109 each include a socket 185 configured to couple to an external drive to drive their actuation mechanism 140 to selectively extend and retract their inner housing 130 relative to their outer housing 180. In the assembled adjustable desk 10, linkages 117 couple the motor 150 of an extendable leg 106, 107 to the actuation mechanism 140 of the adjacent extendable leg 108, 109 such that the motor 150 is configured to drive the actuation mechanism 140 of the extendable leg 108, 109 in unison with the actuation mechanism 140 of the extendable leg 106, 107.

The adjustable desk 10 includes two crossbars 172 coupling an extendable leg 106, 107 to the adjacent extendable leg 108, 109. The adjustable desk 10 further includes a single crossbar 174 coupling the outer housing 180 of extendable leg 107 to the outer housing 180 of the extendable leg 108 on the other side of the desk frame. As shown in FIG. 3P, the adjustable desk 10 further includes a multi-piece desktop 20, with the three crossbars 172, 174 each attached to an underside of the multi-piece desktop 20.

The open-sided adjustable frame 30 provides an open space between the extendable leg 106 and the extendable leg 109. The crossbars 172, 174 are configured to attach to an underside of the U-shaped multi-piece desktop 20 such that the open space between the extendable leg 106 and the extendable leg 109 coincides with an area inside of the U-shaped desktop.

The crossbars 172, 174 each include multiple segments that facilitate adjustable spacing between the extendable legs 106, 107, 108, 109. Linkage 117 is extendable to facilitate driving the second actuation mechanism 140 in unison with the first actuation mechanism 140 at various spacings between the extendable leg 106, 107 and the extendable leg 108, 109. In some examples, crossbars 172, 174 may be adjusted to provide a minimum frame size of about 30 inches by 46 inches, a maximum frame size of 50 inches by 65 inches or incremental frame sizes between the minimum and maximum. The various frame sizes are suitable for table top sizes ranging from a minimum size of about 36 inches by 50 inches to a maximum size of about 60 inches by 90 inches. In the illustrated example, the multi-piece desktop 20 is about 60 inches by 83 inches. Other examples are suitable for smaller or larger desktops.

The multiple segments of each crossbar 172 include a tubular short crossbar segment 112, 114 and a tubular long crossbar segment 113, 115 coupled together with a long connector bracket 118. The long connector bracket 118 spans the gap between the tubular short crossbar segment 112, 114 and the tubular long crossbar segment 113, 115 to facilitate the adjustable spacing. In some examples, the tubular short crossbar segment 112, 114 may also fit within the tubular long crossbar segment 113, 115, or vice versa, allowing the crossbar segments to overlap to facilitate further adjustable spacing.

The multiple segments of each crossbar 174 include a short right crossbar segment 112, a short left crossbar segment 114 and a middle crossbar segment 116 coupled together with two short connector brackets 119. The short connector brackets 119 span the gaps between the tubular short crossbar segment 112, 114 and the middle crossbar segment 116 to facilitate the adjustable spacing. In some examples, the tubular short crossbar segment 112, 114 may also fit within the middle crossbar segment 116, or vice versa, allowing the crossbar segments to overlap to facilitate further adjustable spacing.

Using multiple segments for crossbars 172, 174 allow adjustable desk 10 to conform to multiple desktop sizes. In addition, the multiple segments for crossbars 172, 174 reduce overall package dimensions for a kit used to build adjustable desk 10. In some examples, a packaging size with a maximum box length of 18 inches may reduce shipping expenses compared to designs requiring larger packaging. In the same or different examples, the components of crossbars 172, 174 may be formed from a thin-walled metal tubes, such as a steel or aluminum tubing. Because the crossbars 172, 174 are mounted to the desktop, lighter weight materials may be utilized.

FIGS. 2A-2D illustrate an adjustable frame subassembly 190 including two adjustable height legs 106, 108 driven by a single motor 150. Adjustable height legs 107, 109 are mechanically equivalent to adjustable height legs 106, 108, such that the details shown and described with respect to adjustable height legs 106, 108 also apply to adjustable frame subassembly 191 including the adjustable height legs 107, 109.

The motor 150 is mounted to the outer housing 180 of the extendable leg 106. The motor 150 configured to drive their actuation mechanism 140 to selectively extend and retract their inner housing 130 relative to the outer housing 180 of the extendable leg 106. In contrast, extendable leg 108 includes a socket 185 configured to couple to an external drive to drive their actuation mechanism 140 to selectively extend and retract their inner housing 130 relative to their outer housing 180. The extendable legs 106, 108 each include a plurality of glide plates 138 configured to mitigate friction between the outer housing 180 and the inner housing 130.

In the assembled adjustable desk 10, linkages 117 couple the motor 150 of extendable leg 106 to the actuation mechanism 140 of the adjacent extendable leg 108 such that the motor 150 is configured to drive the actuation mechanism 140 of the extendable leg 108 in unison with the actuation mechanism 140 of the extendable leg 106. The extendable leg 108 is mechanically equivalent to the extendable leg 106 such the extendable leg 108 extends and retracts in unison with the extendable leg 106 in response to rotation of the motor 150.

The linkage 117 includes a telescopic drive shaft including an outer tube 162 with a central lumen, an inner rod 164 within the central lumen and a fitting 166 configured to selectively fix a position of the inner rod 164 within the central lumen relative to the outer tube 162. In the example of linkage 117, the fitting 166 is a threaded compression fitting 166.

The extendable leg 106 includes an actuation mechanism 140 including a drive gear 184 coupled to the motor 150, and rotatably fixed relative the outer housing 180, a threaded shaft 142 coupled to the drive gear 184 and extending within the first inner housing 130, and a threaded nut 144 engaged with the threaded shaft 142 and coupled to the inner housing 130 via cap 132, thereby providing a linear actuator that facilitates the extension and retraction of the inner housing 130 relative to the outer housing 180. The drive gear 184 includes a right angle gear box with an input gear 186 coupled to the motor 150 and an output gear 187 coupled to the threaded shaft 142. A housing of the right angle gear box is coupled to the outer housing 180, e.g., using rivets 183. Outer housing 180 includes an optional cap 182. In some examples, the adjustable desk 10 further includes a gear reducer 152 between the motor 150 and the drive gear 187. For example, the gear reducer May include a right angle gear between the motor 150 and the drive gears 184 of the adjustable height legs 106, 108.

Figure 3A:
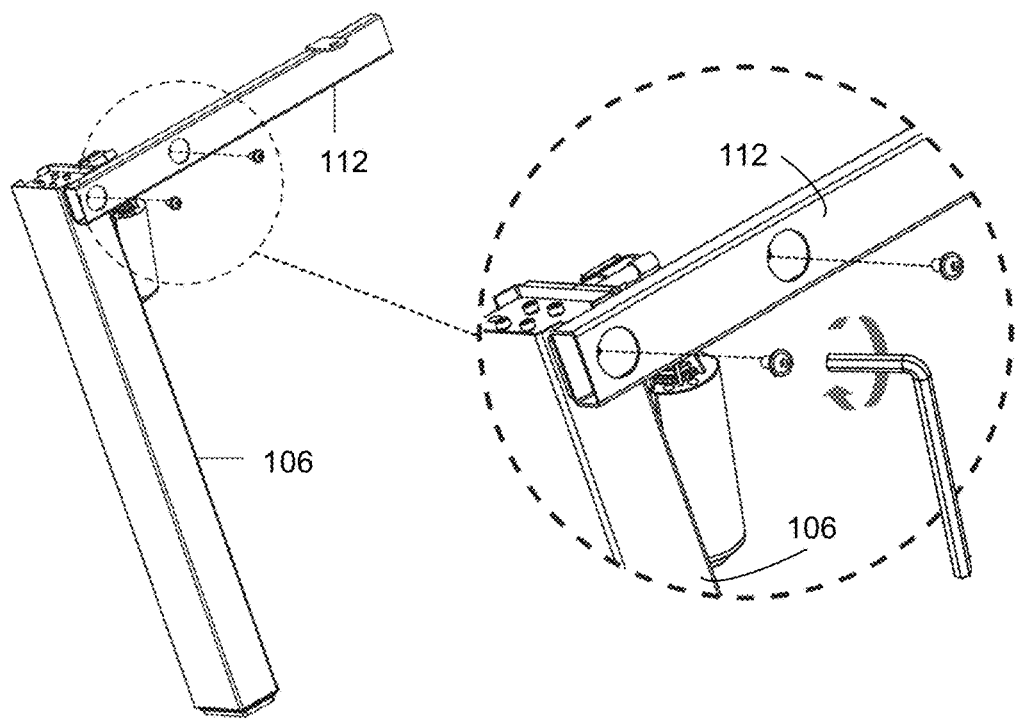
FIGS. 3A-3R illustrate steps for assembling an adjustable desk and desktop.
Figure 3B:
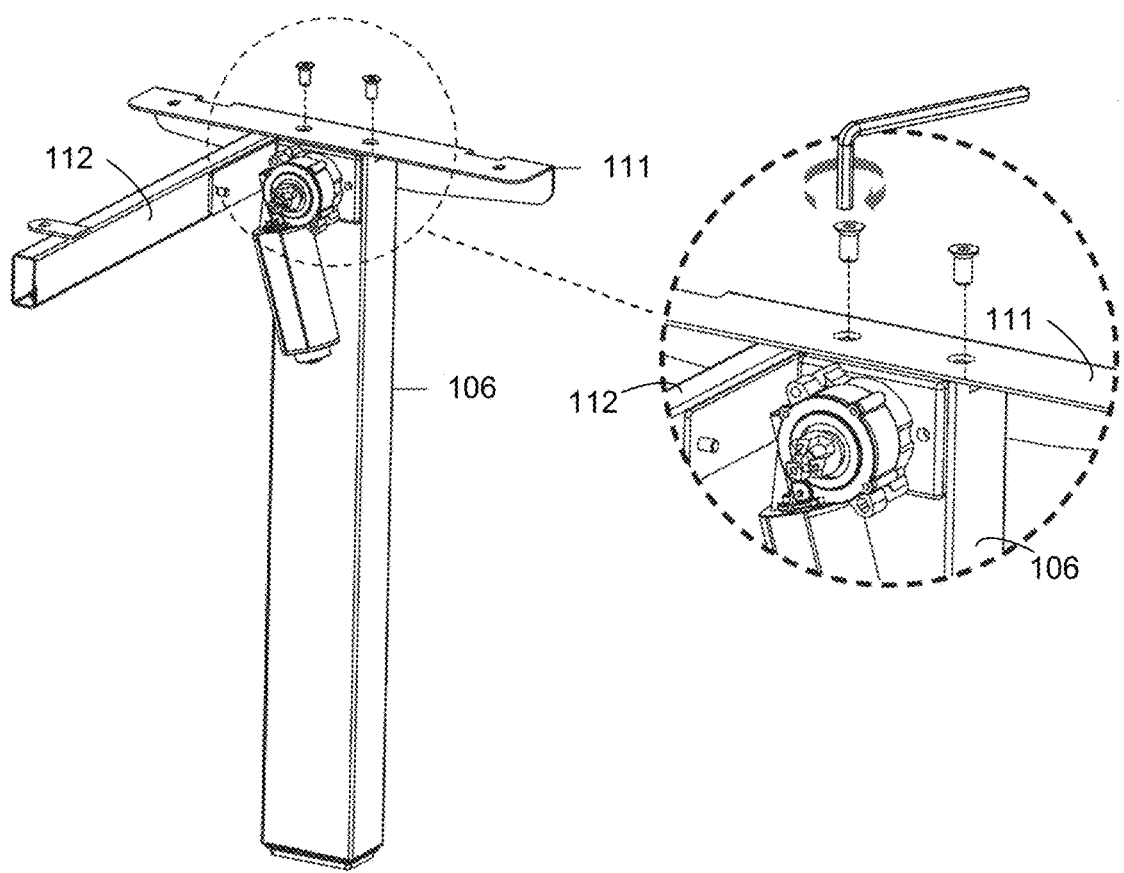
Figure 3C:
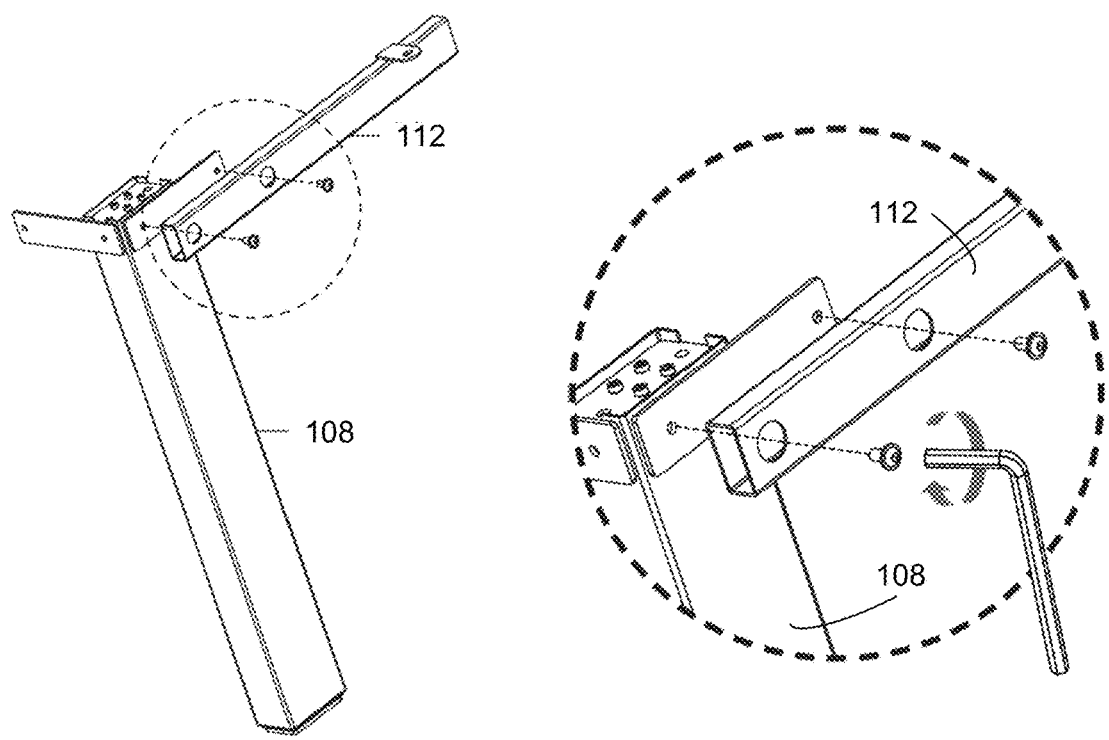
Figure 3D:
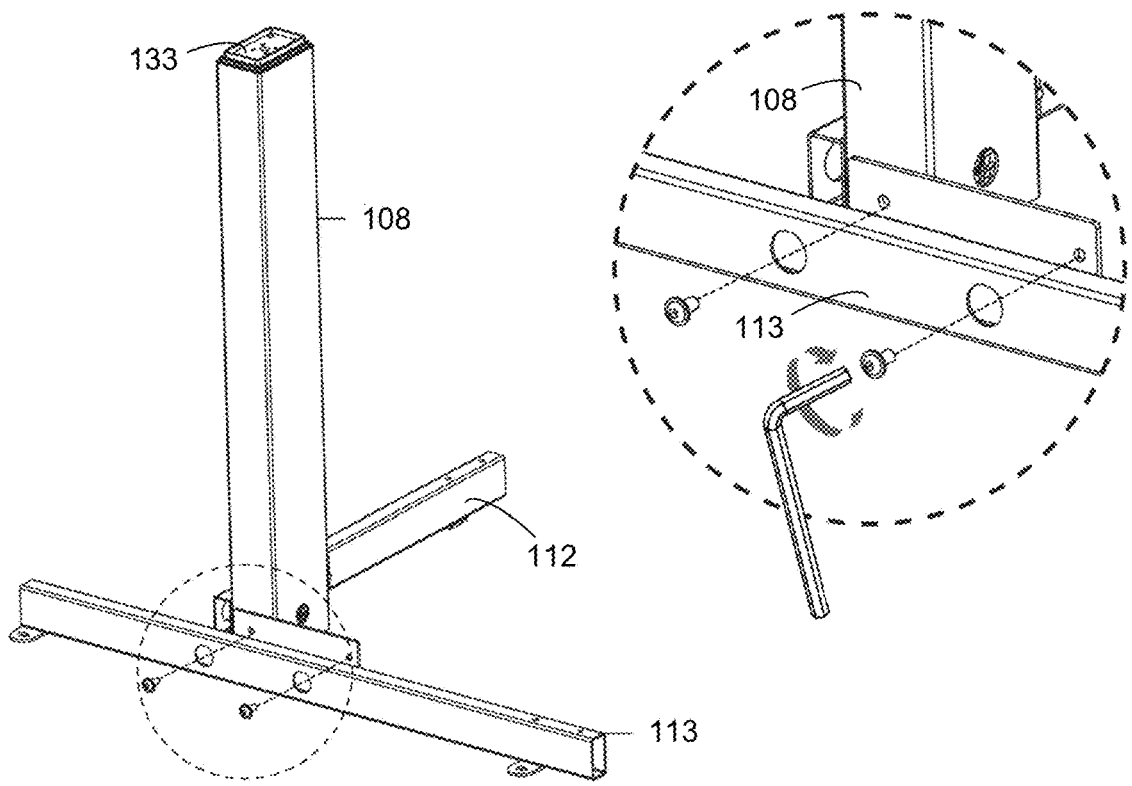
Figure 3E:
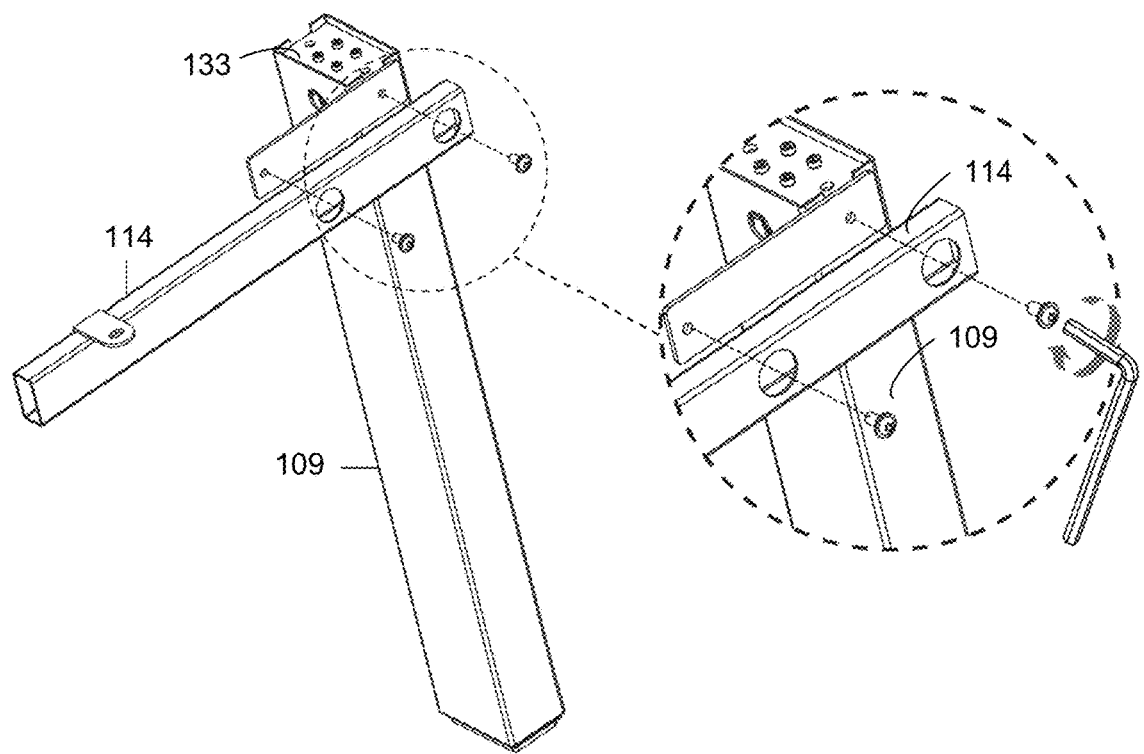
Figure 3F:
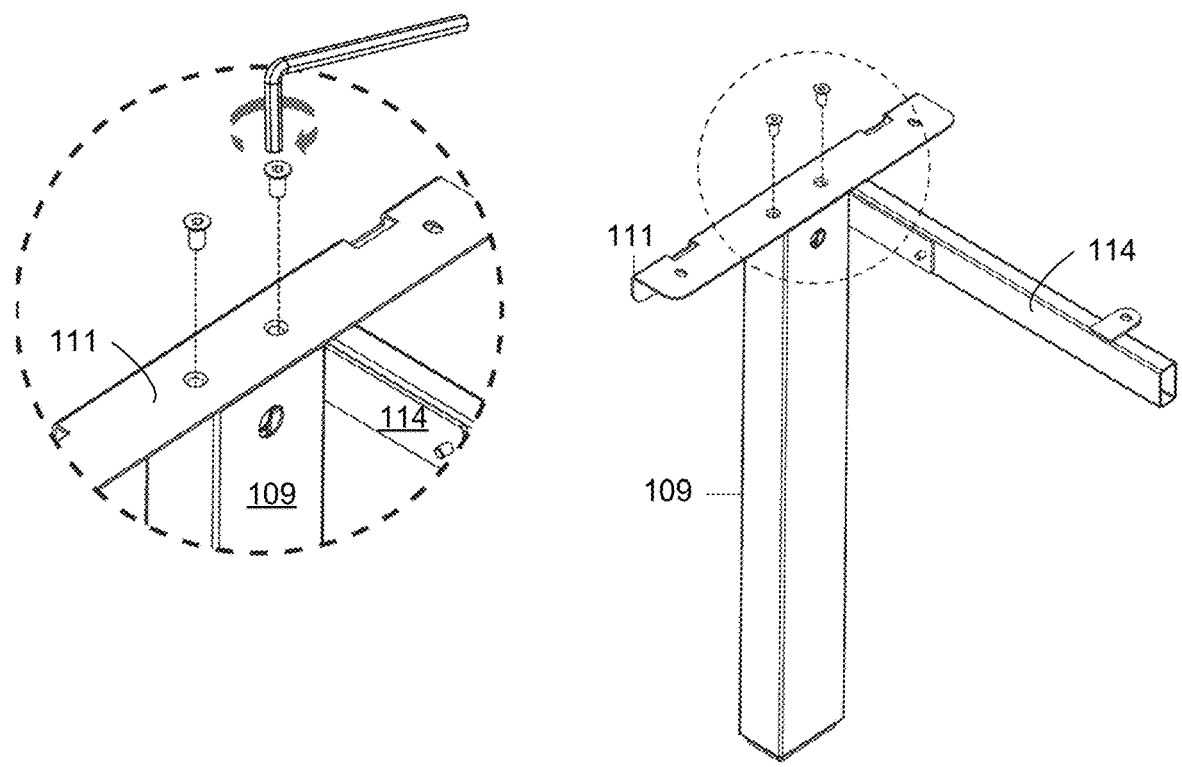
Figure 3G:
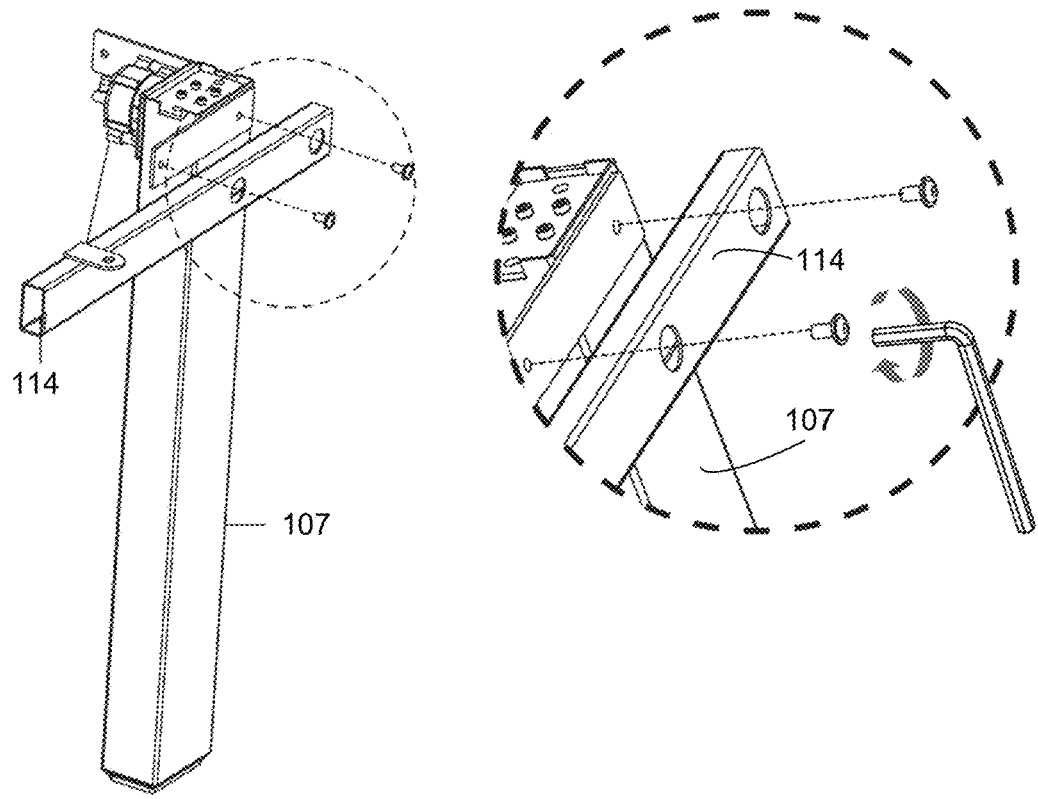
Figure 3H:
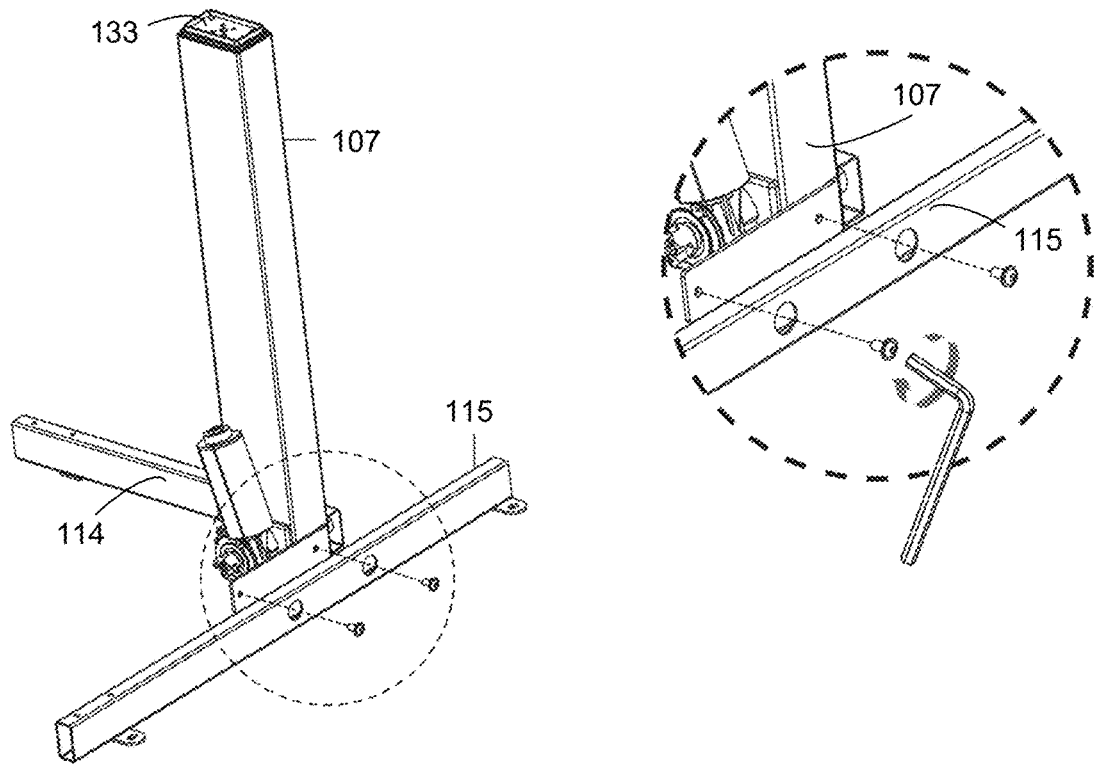
Figure 3I:
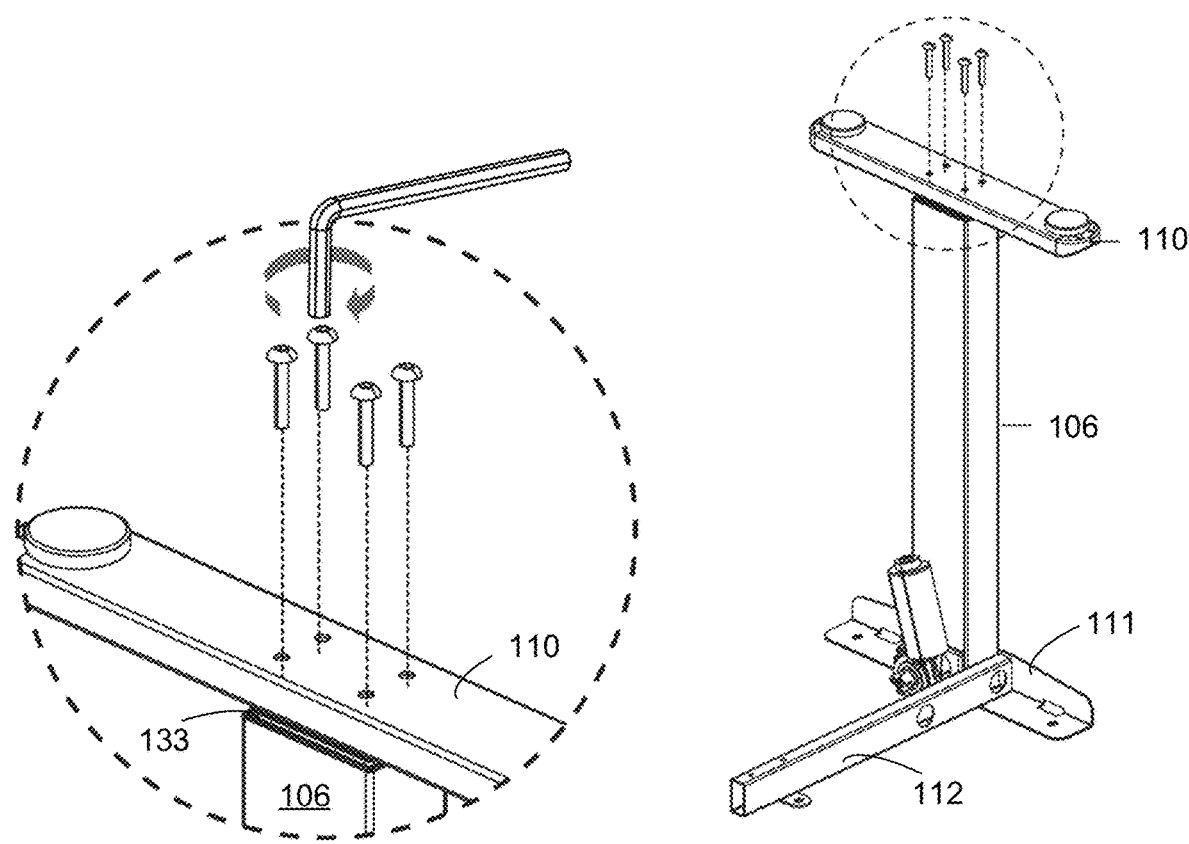
Figure 3J:
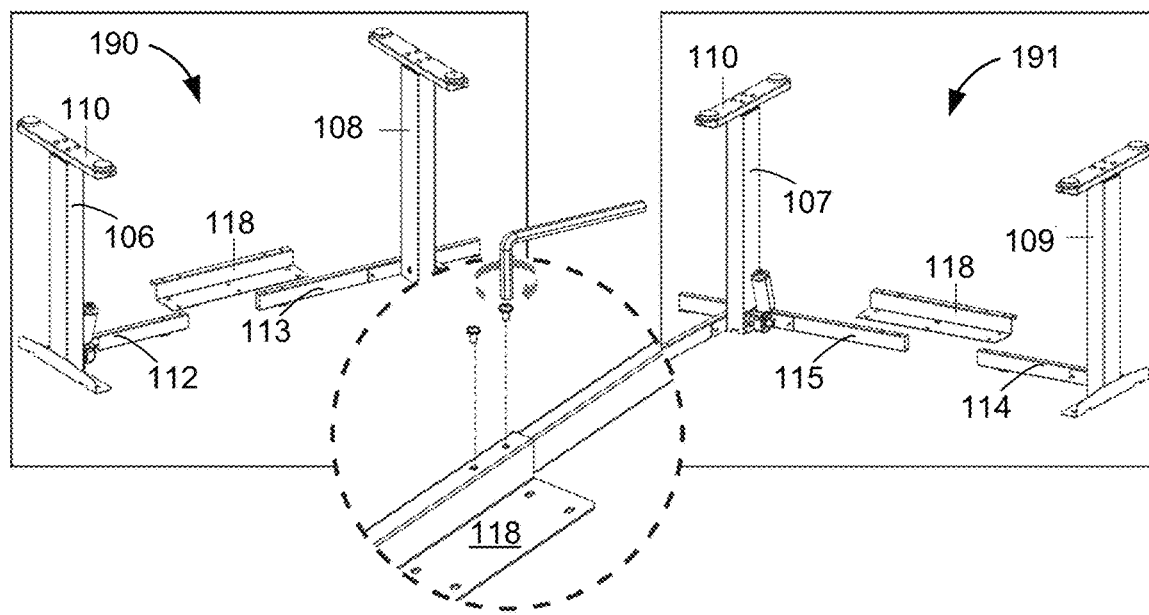
Figure 3K:
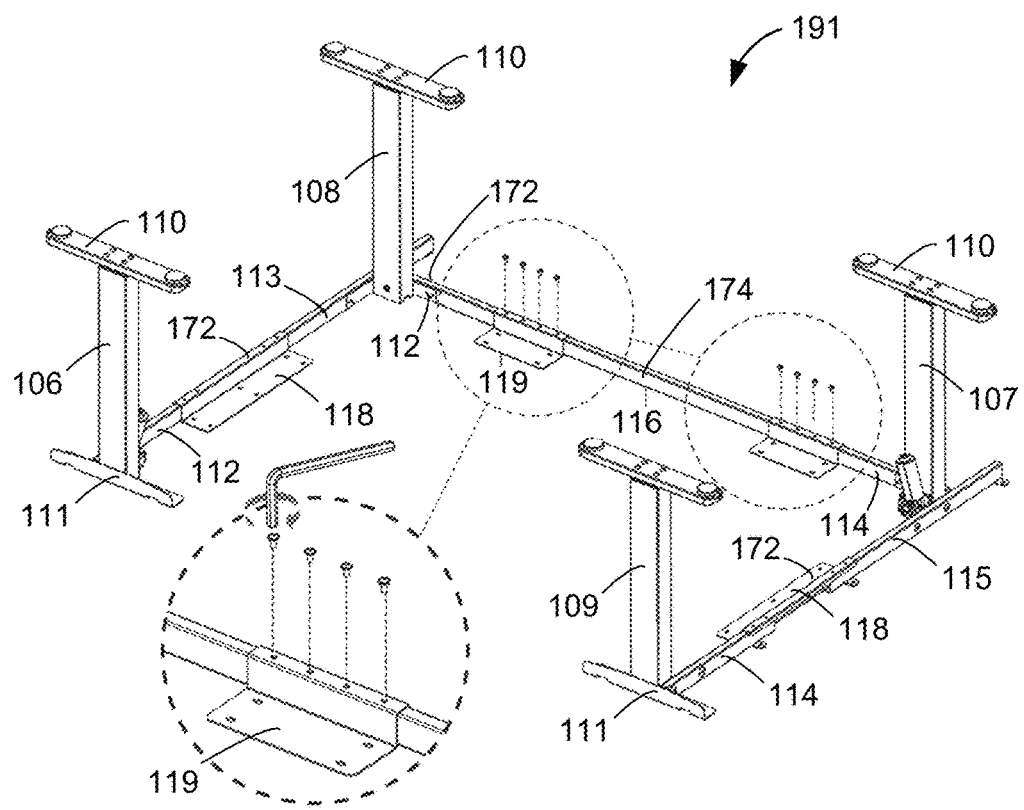
Figure 3L:
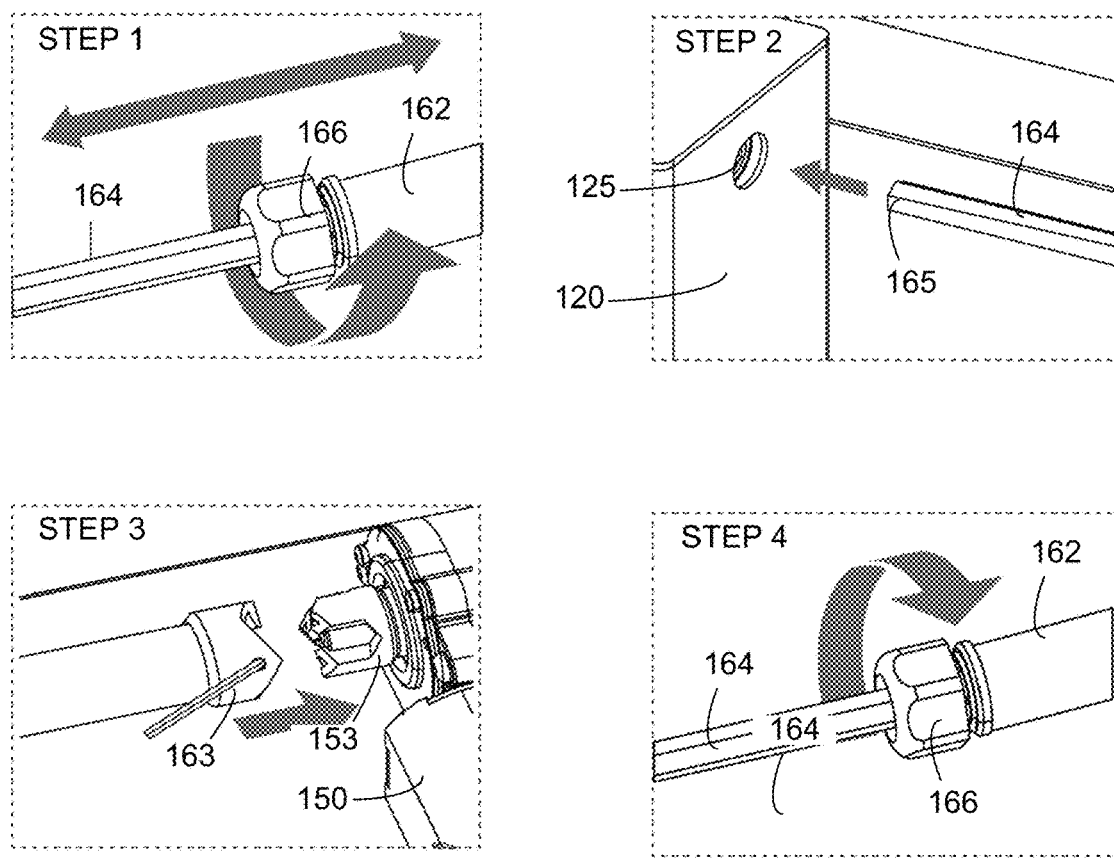
Figure 3M:
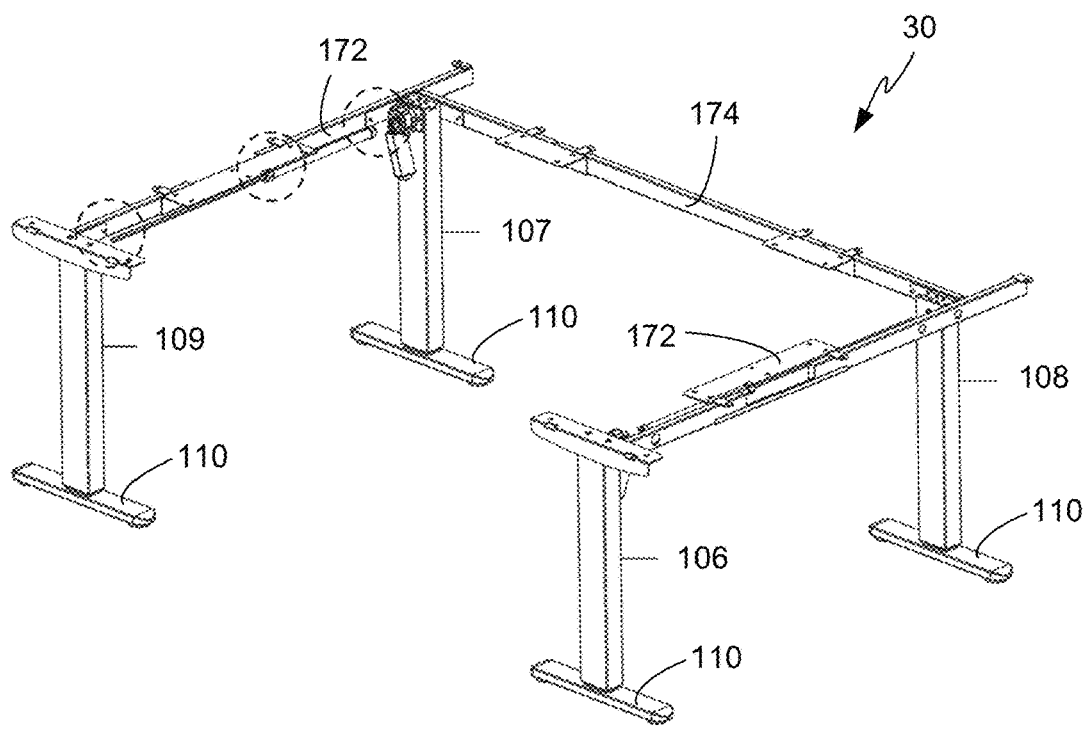
Figure 3N:
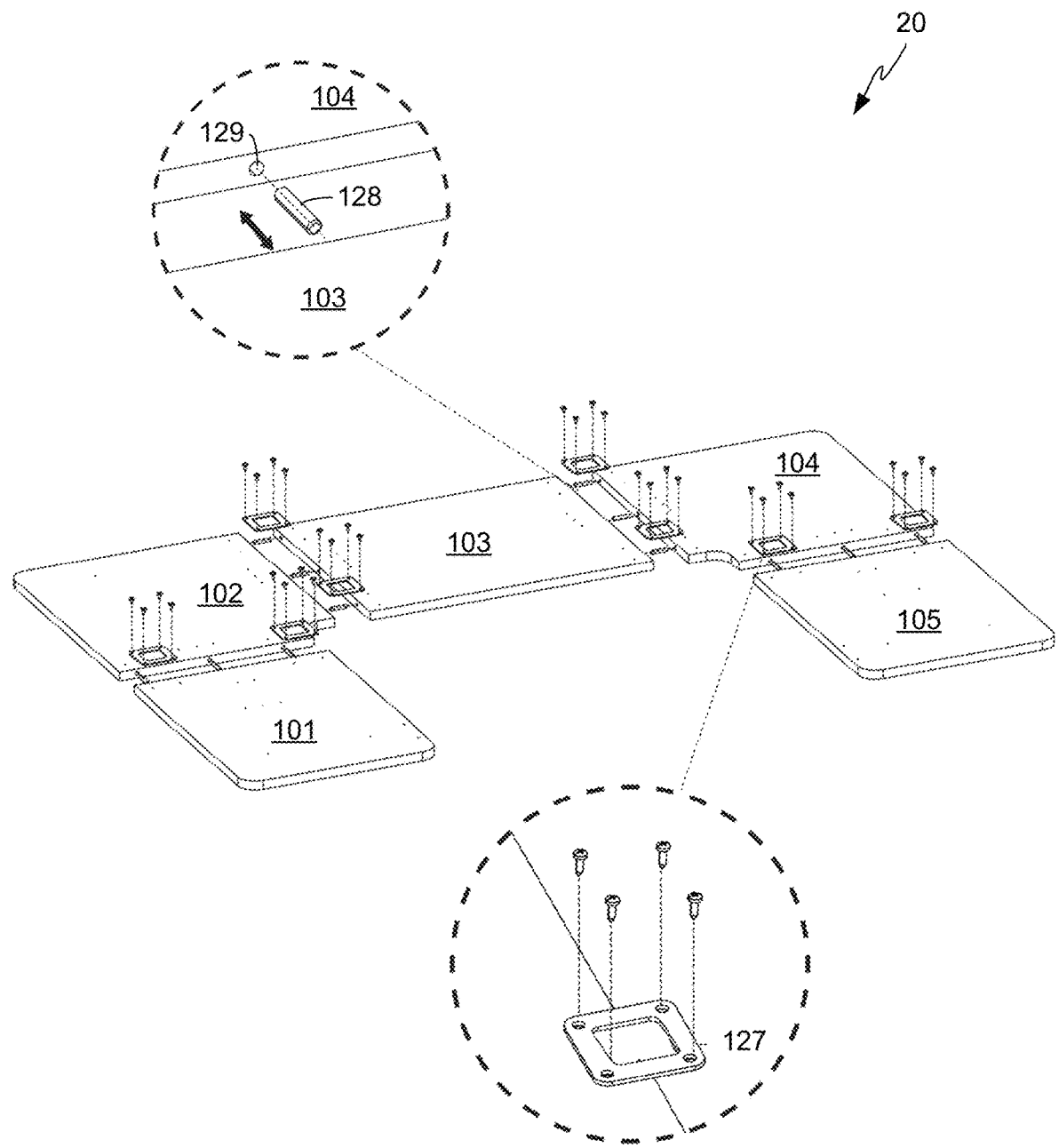
Figure 3O:
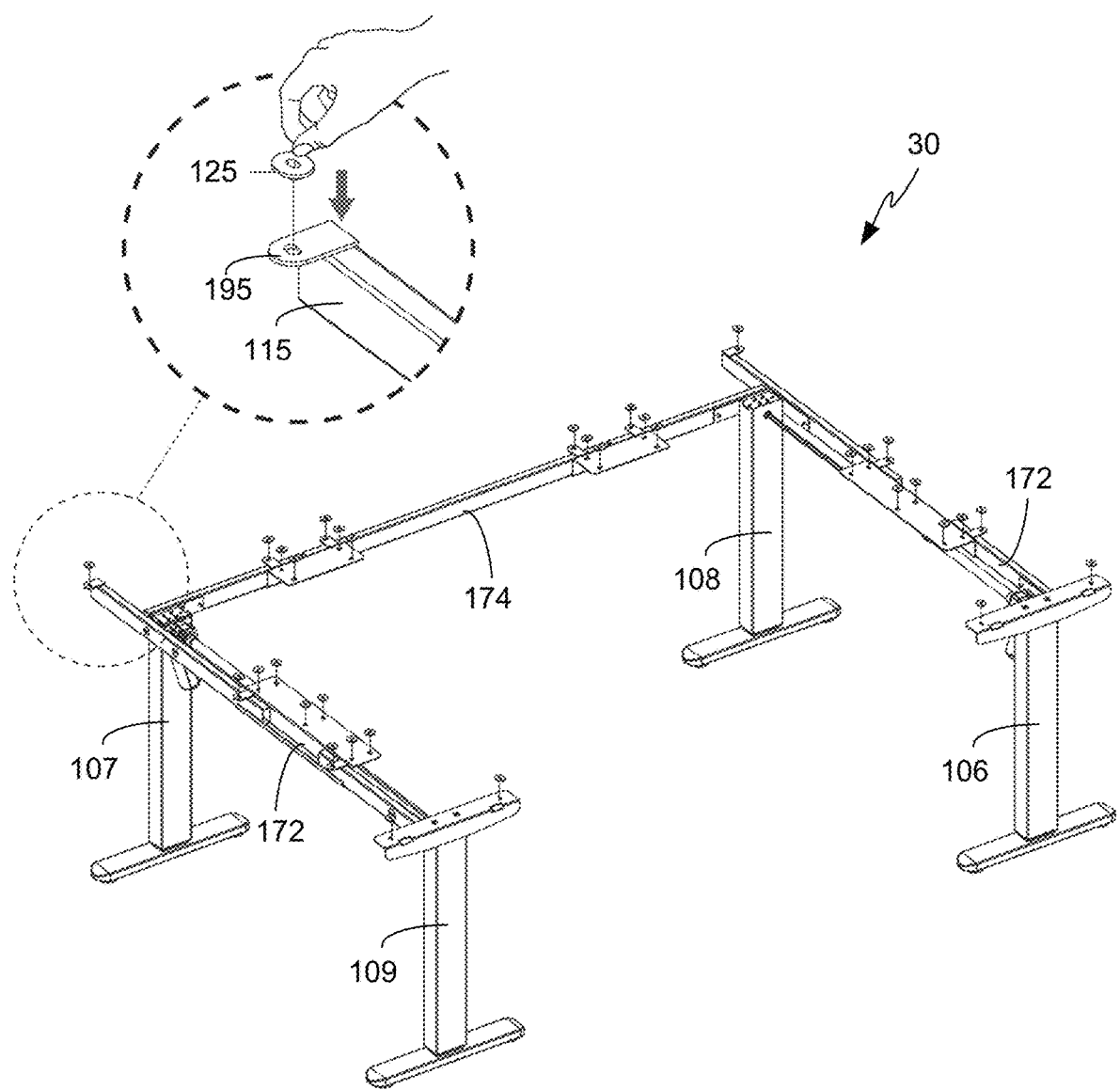
Figure 3P:
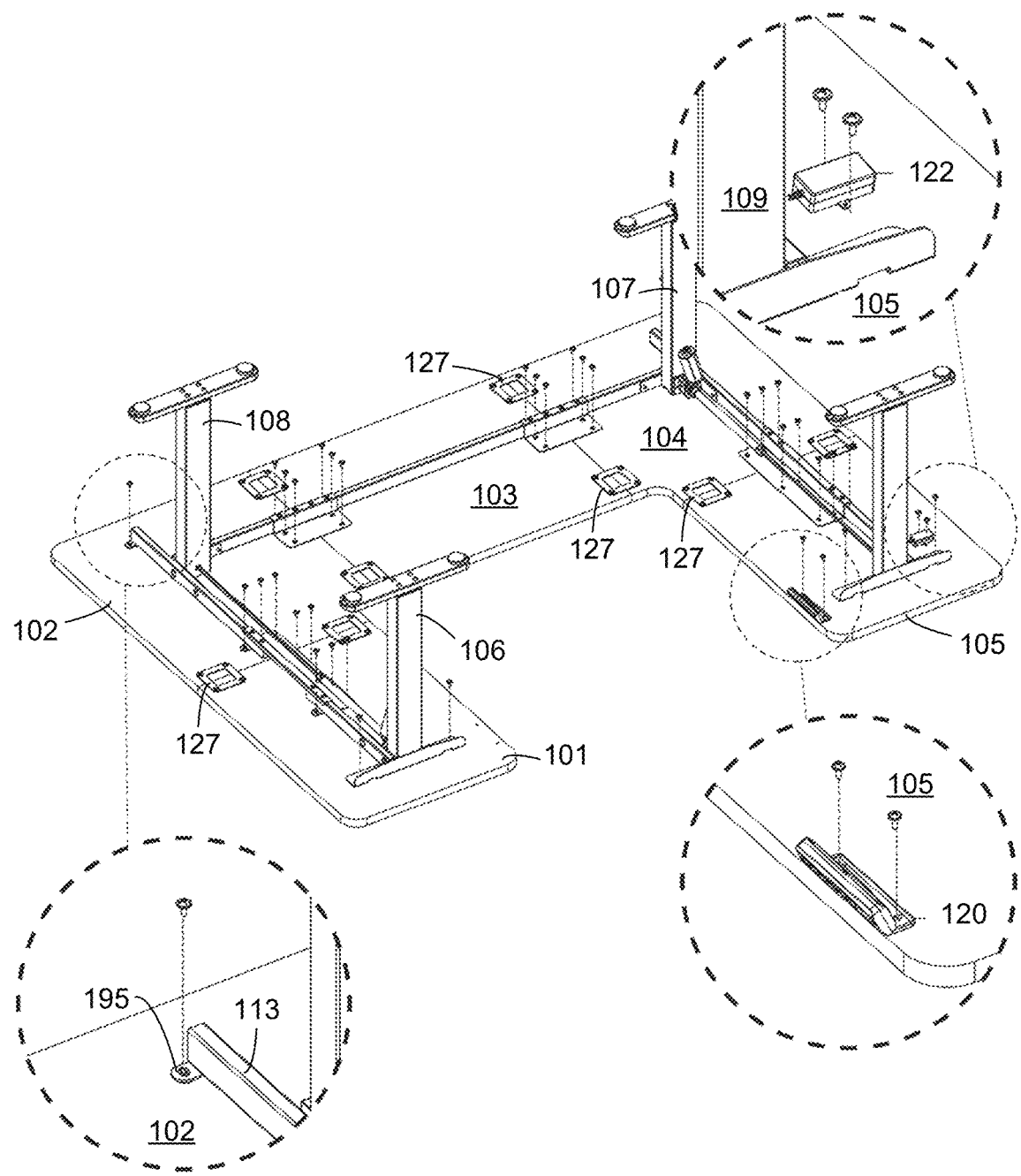
Figure 3Q:
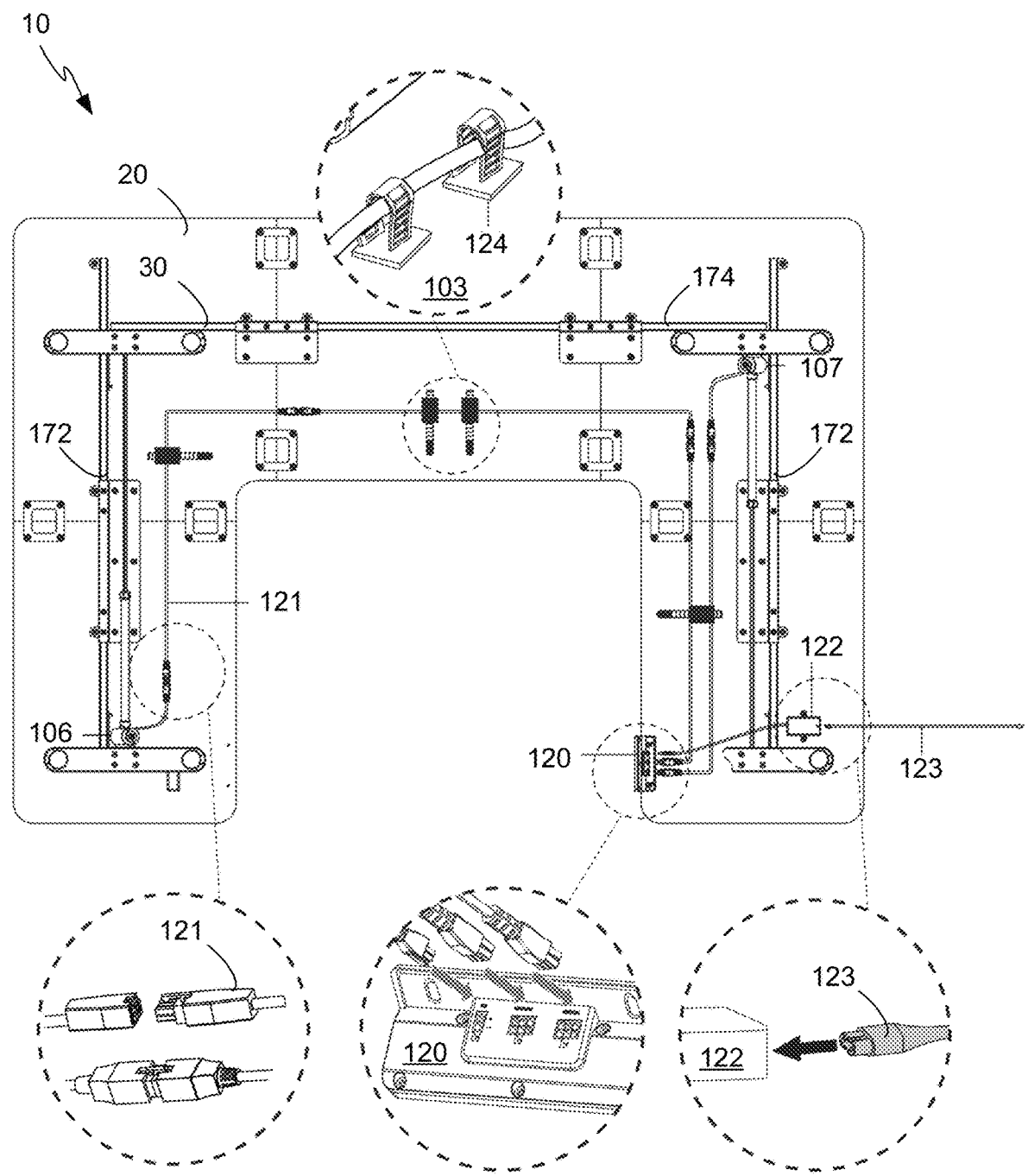
Figure 3R:
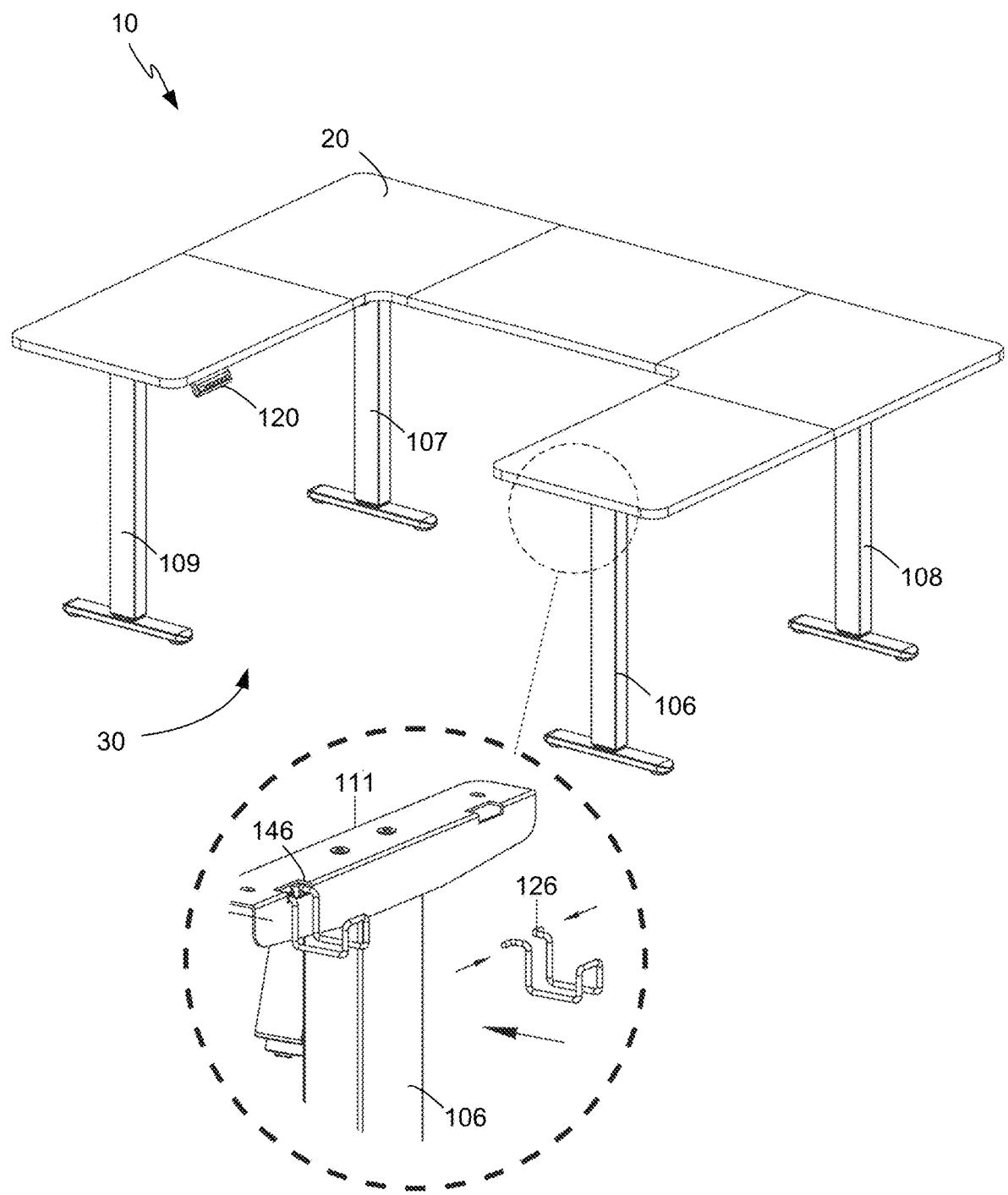

FIGS. 3A-3R illustrate steps for assembling adjustable desk 10. Specifically, FIGS. 3A-3J illustrate steps for forming the two adjustable frame subassemblies 190, 191 of adjustable desk 10, and FIGS. 3K-3M illustrate combining the two adjustable frame subassemblies 190, 191 with crossbar 174 to form the adjustable frame 30. FIGS. 3N-3P illustrate attaching the multi-piece desktop 20 to the adjustable frame 30 to form an assembled height adjustable desk 10, FIG. 3Q illustrates connecting wiring to power and control the assembled height adjustable desk 10, and FIG. 3R illustrates installing optional hooks 126 to the adjustable frame 30 underneath the multi-piece desktop 20 in the assembled height adjustable desk 10. The description of FIGS. 3A-3R includes example details, such as screws and detailed dimensions; however, any suitable fixation mechanisms may be used, and the techniques of this disclosure may be adapted for any desired dimension.

FIGS. 3A and 3B illustrate steps for assembling a leg assembly including adjustable height leg 106. As shown in FIG. 3A, short right crossbar segment 112 is attached to adjustable height leg 106 with two M6×11 mm screws using a 5 mm Allen wrench. As shown in FIG. 3B, a slide bracket 111 is attached to adjustable height leg 106 about perpendicular to the short right crossbar segment 112 with two M8×12 mm screws and the 5 mm Allen wrench.

FIGS. 3C and 3D illustrate steps for assembling a leg assembly including adjustable height leg 108. As shown in FIG. 3C, short right crossbar segment 112 is attached to adjustable height leg 108 with two M6×11 mm screws using a 5 mm Allen wrench. As shown in FIG. 3D, long right crossbar segment 113 is attached to adjustable height leg 108 about perpendicular to the short right crossbar segment 112 with two M6×11 mm screws and the 5 mm Allen wrench.

FIGS. 3E and 3F illustrate steps for assembling a leg assembly including adjustable height leg 109. As shown in FIG. 3E, short left crossbar segment 114 is attached to adjustable height leg 109 with two M6×11 mm screws using a 5 mm Allen wrench. As shown in FIG. 3F, a slide bracket 111 is attached to adjustable height leg 109 about perpendicular to the short left crossbar segment 114 with two M8×12 mm screws and the 5 mm Allen wrench.

FIGS. 3G and 3H illustrate steps for assembling a leg assembly including adjustable height leg 108. As shown in FIG. 3G, short left crossbar segment 114 is attached to adjustable height leg 108 with two M6×11 mm screws using a 5 mm Allen wrench. As shown in FIG. 3H, long left crossbar segment 115 is attached to adjustable height leg 108 about perpendicular to the short left crossbar segment 114 with two M6×11 mm screws and the 5 mm Allen wrench.

FIG. 3I illustrates attaching foot 110 to adjustable height leg 106. As shown in FIG. 3G, foot 110 is attached to cap 133 of adjustable height leg 106 with four M6×35 mm screws using a 5 mm Allen wrench. The techniques of FIG. 3I are also applicable to attaching feet 110 to adjustable height legs 107, 108, 109.

FIG. 3J illustrates coupling the two leg assemblies including adjustable height legs 106, 108 with a long connector bracket 118, secured with four M6×11 mm screws, using a 5 mm Allen wrench to form adjustable frame subassembly 190 with a first crossbar 172. In adjustable frame subassembly 190, long connector bracket 118 couples short right crossbar segment 112 to long right crossbar segment 113.

FIG. 3J also illustrates coupling the two leg assemblies including adjustable height legs 107, 108 with a long connector bracket 118, secured with four M6×11 mm screws, to form adjustable frame subassembly 191 with a second crossbar 172. In adjustable frame subassembly 191, long connector bracket 118 couples short left crossbar segment 114 to long left crossbar segment 115.

Next the two subassemblies 190, 191 are combined to form crossbars 174 and complete the adjustable frame 30.

FIG. 3K illustrates assembling and installing middle crossbar segment 116 to between the two adjustable frame subassemblies 190, 191 to form the adjustable frame 30 with the crossbar 174.

Specifically, the middle crossbar segment 116 is securing between the short right crossbar segment 112 of subassembly 190 and the short left crossbar segment 114 of subassembly 191 with two short connector brackets 119. The short connector brackets 119 are each secured using four M6×11 mm screws using a 5 mm Allen wrench.

FIG. 3L illustrates installing the linkage 117, while FIG. 3M illustrates the adjustable frame 30 with both linkages 117 installed. First, the assembly process includes loosening the compression fitting 166 on linkage 117 and inserting the end 165 of inner rod 164 into socket 185 of one of legs 108, 109. In the illustrated example, rod 164 is a hex rod and socket 185 is a hex socket. The assembly process further includes, while holding the end 165 of inner rod 164, pulling the outer tube 162 out until the connector 163 engages with the mating connector 153 of motor 150 on the corresponding motorized adjustable height leg 106, 107. The assembly process further includes tightening the set screw on linkage 117 using a 2 mm Allen wrench, and then tightening the compression fitting 166. This configuration provides infinite adjustability for the length of linkage 117 rather than present incremental spacings.

FIG. 3N illustrates installing rubber pads 125 on a plurality of desktop mounts 195. The desktop mounts 195 are configured to facilitate securing a desktop, such as multi-piece desktop 20, to the open-sided adjustable frame 30. In the example of FIG. 3N, desktop mounts 195 includes tabs that protrude from the upper surfaces of long connector brackets 118 and short connector bracket 119. Each tab includes a through hole configured to accept a wood screw shaft while allowing the head of the wood screw to register against the tab. The desktop mounts 195 further include additional through-holes on the upper surfaces of the long connector brackets 118 and short connector bracket 119. The rubber pads 125 are placed over every through-hole and include holes for accepting wood screw shaft and are configured to cushion the interface of the desktop mounts 195 with the underside of the desktop.

FIG. 3N illustrates assembling the multi-piece desktop 20. As shown in FIG. 3O, multi-piece desktop 20 includes a right desktop corner 102 and a left desktop corner 104 attached on either side of a middle desktop 103. Right desktop extension 101 is attached to right desktop corner 102, and left desktop extension 105 is attached to left desktop corner 104. The right desktop extension 101 and the left desktop extension 105 extend in a common direction to provide a U-shaped configuration for the multi-piece desktop 20.

Each interface between the desktop components of the multi-piece desktop 20: right desktop extension 101, right desktop corner 102, middle desktop 103, left desktop corner 104, and left desktop extension 105, includes dowel pins 128 that insert into coaxial holes 129 at the interface. In addition, two connector plates 127 overlap each interface on a bottom side of the multi-piece desktop 20. Each connector plate 127 is attached to the corresponding desktop components of the interface with four M5×15 mm Phillips screws. The combination of the dowel pins 128 and the connector plates 127 spanning interfaces between the desktop components supports both a rigid connection between the desktop components and planar alignment of the desktop worksurface.

FIG. 3O illustrates an initial step for attaching adjustable desk 10 to multi-piece desktop 20 to form adjustable desk 10. First, the assembly process includes pressing optional rubber pads 125 (not shown) into crossbar tabs that provide mounting points for attaching adjustable desk 10 to multi-piece desktop 20. For example, pads 125 may be formed from a compliant material such an elastomer, foam, or rubber material. The rubber pads 125 may include an optional adhesive layer with a removable backing to facilitate the attachment to the crossbar tabs. Next, the assembly process includes securing adjustable frame 30 to multi-piece desktop 20. adjustable frame 30 is positioned upside down on the underside of multi-piece desktop 20.

FIG. 3P illustrates adjustable desk 10 to multi-piece desktop 20 using M5×16 mm screws and a Phillips screwdriver. The screws are inserted into the holes of each desktop mount 195 and tightened.

FIG. 3Q illustrates connecting wiring to power and control the assembled height adjustable desk 10. The assembly process includes attaching power adapter 122 to multi-piece desktop 20 using M5×16 mm screws and a Phillips screwdriver. The assembly process further includes attaching control panel 120 to multi-piece desktop 20 using M4×15 mm screws and a Phillips screwdriver.

Connecting power to adjustable desk 10 includes connecting the cord from both adjustable height legs 106, 107 to the two slots on control panel 120. Optional extension cables 121 can be connected to adjustable height legs 106, 107 if extra length is needed to reach control panel 120. Power adapter 122 is connected to control panel 120 and power cable 123 is connected to power adapter 122 and a wall outlet. Cable clips 124 may be used to secure the cables to multi-piece desktop 20. For example, cable clips 124 may include an adhesive layer with a removable backing to facilitate easy attachment to the underside of multi-piece desktop 20. In some examples, cable clips 124 may be injected molded components formed from plastic materials.

Control panel 120 includes up and down arrows to raise and lower multi-piece desktop 20. It also includes memory buttons to allow a user to save and recall preset heights. When raising or lowering multi-piece desktop 20, control panel 120 delivers simultaneous signals to the two motors 150 such that each of the legs 106, 107, 108, 109 extends and retracts in unison.

FIG. 3R illustrates installing optional hooks 126 to the adjustable frame 30 underneath the multi-piece desktop 20 in the assembled height adjustable desk 10. As shown in FIG. 3R, each side bracket 111 includes two slots 146 below the underside of the desktop. Each slot 146 is configured to receive a hook 126. The hook 126 is formed from a wire. Installing a hook 126 includes compressing the ends of the wire to elastically deform the hook 126 and inserting the ends of the hook 126 into the desired slot 146. The hook may be useful for hanging personal items, such as a bag or purse, underneath the desktop.

The specific techniques for adjustable desks, including techniques described with respect to adjustable desk 10, are merely illustrative of the general inventive concepts included in this disclosure as defined by the following claims.

What is claimed is:

1. An adjustable desk comprising:
    a first extendable leg including a first outer housing, a first inner housing, and a first actuation mechanism to selectively extend and retract the first inner housing relative to the first outer housing;
    a second extendable leg including a second outer housing, a second inner housing, and a second actuation mechanism to selectively extend and retract the second inner housing relative to the second outer housing;
    a third extendable leg including a third outer housing, a third inner housing, and a third actuation mechanism to selectively extend and retract the third inner housing relative to the third outer housing;
    a fourth extendable leg including a fourth outer housing, a fourth inner housing, and a fourth actuation mechanism to selectively extend and retract the fourth inner housing relative to the fourth outer housing;
    a motor configured to drive the first actuation mechanism to selectively extend and retract the first inner housing relative to the first outer housing; and
    a linkage coupling the motor to the second actuation mechanism such that the motor is configured to drive the second actuation mechanism in unison with the first actuation mechanism,
    wherein the linkage includes a telescopic drive shaft,
    wherein the telescopic drive shaft includes an outer tube with a central lumen, an inner rod within the central lumen and a fitting configured to selectively fix a position of the inner rod within the central lumen relative to the outer tube; and
    an open-sided adjustable frame including:
        a first crossbar extending between the first extendable leg and the second extendable leg;
        a second crossbar extending between the second extendable leg and the third extendable leg;
        a third crossbar extending between the third extendable leg and the fourth extendable leg; and
        a plurality of desktop mounts configured to facilitate securing a desktop to the open-sided adjustable frame,
        wherein the open-sided adjustable frame provides an open space between the first extendable leg and the fourth extendable leg.

2. The adjustable desk of claim 1, wherein the motor is mounted to the first outer housing of the first extendable leg.

3. The adjustable desk of claim 1, wherein the second extendable leg is mechanically equivalent to the first extendable leg such the second extendable leg extends and retracts in unison with the first extendable leg in response to rotation of the motor.

4. The adjustable desk of claim 1, wherein the motor is a first motor and the linkage is a first linkage, the adjustable desk further comprising:
    a second motor configured to drive the third actuation mechanism to selectively extend and retract the third inner housing relative to the third outer housing; and
    a second linkage coupling the second motor to the fourth actuation mechanism such that the second motor is configured to drive the fourth actuation mechanism in unison with the third actuation mechanism.

5. The adjustable desk of claim 1, wherein the first extendable leg includes a linear actuator comprising a drive gear coupled to the motor, and rotatably fixed relative to the first outer housing, a threaded shaft coupled to the drive gear and extending within the first inner housing, and a threaded nut engaged with the threaded shaft and coupled to the first inner housing to facilitate the extension and retraction of the first inner housing relative to the first outer housing.

6. The adjustable desk of claim 5,
    wherein the drive gear includes a right angle gear box with an input gear coupled to the motor and an output gear coupled to the threaded shaft, and
    wherein a housing of the right angle gear box is coupled to the first outer housing.

7. The adjustable desk of claim 6, further comprising a gear reducer between the motor and the drive gear.

8. The adjustable desk of claim 1, wherein the first extendable leg includes a plurality of glide plates configured to mitigate friction between the first outer housing and the first inner housing.

9. The adjustable desk of claim 1, further comprising a U-shaped desktop, wherein the first crossbar, the second crossbar, and the third crossbar are each attached to an underside of the U-shaped desktop such that the open space between the first extendable leg and the fourth extendable leg coincides with an area inside of the U-shaped desktop.

10. The adjustable desk of claim 9, wherein the U-shaped desktop is a multi-piece desktop including a plurality of desktop components.

11. The adjustable desk of claim 10, wherein the U-shaped desktop includes dowel pins and connector plates spanning interfaces between the plurality of desktop components.

12. The adjustable desk of claim 9, wherein the first crossbar, the second crossbar, and the third crossbar are attached to an underside of the U-shaped desktop.

13. A kit for an adjustable desk comprising:
    a first extendable leg including a first outer housing, a first inner housing, and a first actuation mechanism to selectively extend and retract the first inner housing relative to the first outer housing;
    a second extendable leg including a second outer housing, a second inner housing, and a second actuation mechanism to selectively extend and retract the second inner housing relative to the second outer housing;
    a third extendable leg including a third outer housing, a third inner housing, and a third actuation mechanism to selectively extend and retract the third inner housing relative to the third outer housing;
    a fourth extendable leg including a fourth outer housing, a fourth inner housing, and a fourth actuation mechanism to selectively extend and retract the fourth inner housing relative to the fourth outer housing;
    a motor configured to drive the first actuation mechanism to selectively extend and retract the first inner housing relative to the first outer housing;
    a linkage configured to couple the motor to the second actuation mechanism such that the motor is configured to drive the second actuation mechanism in unison with the first actuation mechanism,
    wherein the linkage includes a telescopic drive shaft,
    wherein the telescopic drive shaft includes an outer tube with a central lumen, an inner rod within the central lumen and a fitting configured to selectively fix a position of the inner rod within the central lumen relative to the outer tube; and
    an open-sided adjustable frame including:
        a first crossbar configured to extend between the first extendable leg and the second extendable leg;
        a second crossbar configured to extend between the second extendable leg and the third extendable leg;
        a third crossbar configured to extend between the third extendable leg and the fourth extendable leg; and
        a plurality of desktop mounts configured to facilitate securing a desktop to the open-sided adjustable frame,
        wherein the open-sided adjustable frame is configured to provide an open space between the first extendable leg and the fourth extendable leg.

14. The kit of claim 13, wherein the first crossbar, the second crossbar, and the third crossbar are configured to be attached to an underside of a desktop.

15. The kit of claim 13, wherein the first crossbar, the second crossbar, and the third crossbar each include multiple segments that facilitate adjustable spacing between the first extendable leg, and the second extendable leg, between the second extendable leg, and the third extendable leg, and between the third extendable leg and the fourth extendable leg.

16. The kit of claim 13, wherein the motor is a first motor and the linkage is a first linkage, the kit further comprising:
    a second motor configured to drive the third actuation mechanism to selectively extend and retract the third inner housing relative to the third outer housing; and
    a second linkage configured to couple the second motor to the fourth actuation mechanism such that the second motor is configured to drive the fourth actuation mechanism in unison with the third actuation mechanism.

17. The kit of claim 16, wherein the first motor is mounted to the first outer housing of the first extendable leg, and wherein the second motor is mounted to the third outer housing of the third extendable leg.

18. The kit of claim 13, further comprising a U-shaped desktop, wherein the first crossbar, the second crossbar, and the third crossbar configured to attach to an underside of the U-shaped desktop such that the open space between the first extendable leg and the fourth extendable leg coincides with an area inside of the U-shaped desktop.

19. The kit of claim 18, wherein the U-shaped desktop is a multi-piece desktop including a plurality of desktop components.

20. The kit of claim 19, wherein the U-shaped desktop includes dowel pins and connector plates spanning interfaces between the plurality of desktop components.

21. The adjustable desk of claim 13, wherein the motor is mounted to the first outer housing of the first extendable leg.

22. The adjustable desk of claim 13, wherein the second extendable leg is mechanically equivalent to the first extendable leg such the second extendable leg extends and retracts in unison with the first extendable leg in response to rotation of the motor.

23. The adjustable desk of claim 13, wherein the first extendable leg includes a linear actuator comprising a drive gear coupled to the motor, and rotatably fixed relative to the first outer housing, a threaded shaft coupled to the drive gear and extending within the first inner housing, and a threaded nut engaged with the threaded shaft and coupled to the first inner housing to facilitate the extension and retraction of the first inner housing relative to the first outer housing.

24. The adjustable desk of claim 23,
wherein the drive gear includes a right angle gear box with an input gear coupled to the motor and an output gear coupled to the threaded shaft, and
wherein a housing of the right angle gear box is coupled to the first outer housing.

* * * * *